(12) United States Patent (10) Patent No.: US 8,737,703 B2
Mangoubi et al. (45) Date of Patent: May 27, 2014

(54) SYSTEMS AND METHODS FOR DETECTING RETINAL ABNORMALITIES

(75) Inventors: Rami Mangoubi, Newton, MA (US);
Mukund Desai, Needham, MA (US);
Joseph Danko, Shrewsbury, MA (US);
Lloyd Paul Aiello, Belmont, MA (US)

(73) Assignees: The Charles Stark Draper Laboratory, Inc., Cambridge, MA (US); Joslin Diabetes Center, Inc., Boston, MA (US)

( * ) Notice: Subject to any disclaimer, the term of this patent is extended or adjusted under 35 U.S.C. 154(b) by 655 days.

(21) Appl. No.: 12/905,929

(22) Filed: Oct. 15, 2010

(65) Prior Publication Data

US 2011/0170751 A1 Jul. 14, 2011

Related U.S. Application Data

(63) Continuation-in-part of application No. 12/355,567, filed on Jan. 16, 2009.

(60) Provisional application No. 61/021,513, filed on Jan. 16, 2008, provisional application No. 61/011,456, filed on Jan. 16, 2008, provisional application No. 61/143,399, filed on Jan. 8, 2009, provisional application No. 61/279,156, filed on Oct. 15, 2009.

(51) Int. Cl.
*G06K 9/00* (2006.01)

(52) U.S. Cl.
USPC .......................................................... 382/128

(58) Field of Classification Search
None
See application file for complete search history.

(56) References Cited

U.S. PATENT DOCUMENTS

| | | | |
|---|---|---|---|
| 4,220,972 A | 9/1980 | Geokezas et al. | |
| 4,771,470 A | 9/1988 | Geiser et al. | |
| 4,905,296 A | 2/1990 | Nishihara | |
| 5,279,298 A * | 1/1994 | Flower | 600/321 |
| 5,526,258 A | 6/1996 | Bacus | |

(Continued)

FOREIGN PATENT DOCUMENTS

WO  WO-9411841 A1  5/1994

OTHER PUBLICATIONS

Goh et al., "ADRIS: An Automatic Diabetic Retinal Image Screening System." in Medical Data Mining and Knowledge Discovery, Kryzysztof Cios, ed. Springer-Verlag, 2001.*

(Continued)

*Primary Examiner* — Wenpeng Chen
(74) *Attorney, Agent, or Firm* — Foley & Lardner LLP; Edward A. Gordon

(57) ABSTRACT

The systems and methods described herein relate generally to the detection of retinal abnormalities. More particularly, the systems and methods are used to analyze a fundus or other image of the retina. In some implementations, the image is analyzed by interdependently smoothing and segmenting the image. Using the smoothed and segmented image, retinal features can be identifying in the image. The systems and methods can then analyze the detected retinal features to identify retinal abnormalities.

32 Claims, 16 Drawing Sheets
(10 of 16 Drawing Sheet(s) Filed in Color)

(56) References Cited

U.S. PATENT DOCUMENTS

| | | | |
|---|---|---|---|
| 5,757,953 A | 5/1998 | Jang | |
| 5,825,909 A | 10/1998 | Jang | |
| 5,841,509 A | 11/1998 | Harooni et al. | |
| 5,989,835 A | 11/1999 | Dunlay et al. | |
| 6,053,865 A * | 4/2000 | Sugiyama et al. | 600/300 |
| 6,089,716 A | 7/2000 | Lashkari et al. | |
| 6,103,479 A | 8/2000 | Taylor | |
| 6,167,146 A | 12/2000 | Rogers et al. | |
| 6,350,031 B1 | 2/2002 | Lashkari et al. | |
| 6,385,332 B1 | 5/2002 | Zahalka et al. | |
| 6,555,802 B2 | 4/2003 | Osipchuk et al. | |
| 6,620,591 B1 | 9/2003 | Dunlay et al. | |
| 6,658,143 B2 | 12/2003 | Hansen et al. | |
| 6,727,071 B1 | 4/2004 | Dunlay et al. | |
| 6,753,965 B2 | 6/2004 | Kumar et al. | |
| 6,763,128 B1 | 7/2004 | Rogers et al. | |
| 6,778,705 B2 * | 8/2004 | Gutta et al. | 382/224 |
| 6,799,066 B2 | 9/2004 | Steines et al. | |
| 6,898,313 B2 * | 5/2005 | Li et al. | 382/176 |
| 6,903,735 B2 * | 6/2005 | Jeong et al. | 345/418 |
| 6,909,804 B2 * | 6/2005 | Caruso et al. | 382/166 |
| 6,983,074 B1 * | 1/2006 | Clauson et al. | 382/244 |
| 6,996,260 B1 | 2/2006 | Skands et al. | |
| 6,999,620 B1 * | 2/2006 | Harville | 382/173 |
| 7,024,054 B2 * | 4/2006 | Cahill et al. | 382/294 |
| 7,088,845 B2 | 8/2006 | Gu et al. | |
| 7,200,495 B2 | 4/2007 | Desai | |
| 7,302,096 B2 | 11/2007 | Kim | |
| 7,383,237 B2 | 6/2008 | Zhang et al. | |
| 7,885,463 B2 * | 2/2011 | Zhang et al. | 382/173 |
| 8,098,907 B2 * | 1/2012 | Yan et al. | 382/128 |
| 8,199,984 B2 * | 6/2012 | Mori et al. | 382/128 |
| 2001/0012398 A1 * | 8/2001 | Todoroki | 382/166 |
| 2001/0024529 A1 | 9/2001 | Chao et al. | |
| 2001/0052933 A1 | 12/2001 | Nybo et al. | |
| 2002/0025514 A1 | 2/2002 | Jaworski et al. | |
| 2002/0052551 A1 | 5/2002 | Sinclair et al. | |
| 2003/0058111 A1 * | 3/2003 | Lee et al. | 340/573.1 |
| 2003/0058341 A1 * | 3/2003 | Brodsky et al. | 348/169 |
| 2003/0077569 A1 | 4/2003 | Clausell et al. | |
| 2003/0100024 A1 | 5/2003 | Cassells et al. | |
| 2003/0149535 A1 | 8/2003 | Sudo et al. | |
| 2003/0185450 A1 | 10/2003 | Garakani et al. | |
| 2004/0018485 A1 | 1/2004 | Ravkin et al. | |
| 2004/0063162 A1 | 4/2004 | Dunlay et al. | |
| 2004/0072254 A1 | 4/2004 | Callamaras et al. | |
| 2004/0175058 A1 * | 9/2004 | Jojic et al. | 382/305 |
| 2004/0197015 A1 | 10/2004 | Fan et al. | |
| 2004/0222987 A1 * | 11/2004 | Chang et al. | 345/419 |
| 2004/0258285 A1 * | 12/2004 | Hansen et al. | 382/128 |
| 2005/0232506 A1 * | 10/2005 | Smith et al. | 382/254 |
| 2006/0170769 A1 * | 8/2006 | Zhou | 348/143 |
| 2006/0280351 A1 * | 12/2006 | Luping et al. | 382/128 |
| 2007/0019846 A1 | 1/2007 | Bullitt et al. | |
| 2007/0122039 A1 * | 5/2007 | Zhang et al. | 382/199 |
| 2007/0177825 A1 * | 8/2007 | Suzuki et al. | 382/308 |
| 2007/0296721 A1 * | 12/2007 | Chang et al. | 345/427 |
| 2008/0002152 A1 | 1/2008 | Collins et al. | |
| 2008/0002856 A1 * | 1/2008 | Ma et al. | 382/103 |
| 2008/0069411 A1 | 3/2008 | Friedman et al. | |
| 2008/0089665 A1 | 4/2008 | Thambiratnam et al. | |
| 2008/0243439 A1 * | 10/2008 | Runkle et al. | 702/188 |
| 2008/0304743 A1 * | 12/2008 | Tang et al. | 382/173 |
| 2009/0005693 A1 | 1/2009 | Brauner et al. | |
| 2009/0060352 A1 * | 3/2009 | Distante et al. | 382/224 |
| 2009/0180693 A1 | 7/2009 | Desai et al. | |
| 2009/0312985 A1 * | 12/2009 | Eliazar | 702/187 |
| 2009/0328239 A1 * | 12/2009 | Brauner et al. | 800/3 |
| 2010/0002929 A1 | 1/2010 | Sammak et al. | |
| 2010/0033484 A1 * | 2/2010 | Kim et al. | 345/426 |
| 2010/0111370 A1 * | 5/2010 | Black et al. | 382/111 |
| 2010/0158372 A1 * | 6/2010 | Kim et al. | 382/171 |
| 2010/0208942 A1 * | 8/2010 | Porter et al. | 382/106 |
| 2011/0013836 A1 * | 1/2011 | Gefen et al. | 382/171 |
| 2011/0050878 A1 * | 3/2011 | Wells et al. | 348/86 |
| 2011/0103657 A1 * | 5/2011 | Kang et al. | 382/128 |
| 2011/0134242 A1 * | 6/2011 | Loubser et al. | 348/143 |
| 2012/0069051 A1 * | 3/2012 | Hagbi et al. | 345/633 |

OTHER PUBLICATIONS

Desai et al., "Adaptive Robust Constrained Matched Filter and Subspace Detection," Conference Record of the IEEE 36th Asilomar Conference on Signals, Systems and Computers, Monterey, Calif., 768-772 (2002).

Desai et al., "Diffusion Tensor Model Based Smoothing," IEEE International Symposium on Biomedical Imaging, pp. 705-708 (2002).

Desai et al., "Dual Redundant Sensor FDI Techniques Applied to the NASA F8C DFBW Aircraft," Proc. AIAA Conference on Guidance and Control, 502-513(1976).

Desai et al., "Functional MRI Activity Characterization Using Response Time Shift Estimates From Curve Evolution," IEEE Transactions on Medical Imaging, 21(11):1402-1412 (2002).

Desai et al., "Functional MRI Activity Characterization: An Estimation and Decision Theoretic Approach," Medical Imaging Systems Technology, 5:251-295 (2005).

Desai et al., "Model Based Variational Smoothing and Segmentation for Diffusion Tensor Imaging in the Brain," Neuroinformatics, 4(3):217-233 (2006).

Desai et al., "Non Gaussian Subspace Learning in the Presence of Interference," 3rd IEEE Sensor Array and Multichannel Signal Processing Workshop, Barcelona, Spain (Jul. 2004).

Desai et al., "Robust Constrained Non Gaussian fMRI Detection," 3rd IEEE International Symposium on Biomedical Imaging, Arlington, Virginia, 1076-1079 (Apr. 2006).

Desai et al., "Robust Gaussian and Non-Gaussian Matched Subspace Detection," IEEE Transactions on Signal Processing, 51(12):3115-3127 (2003).

Desai et al., "Robust Non Gaussian Matched Subspace Detectors," EUSIPCO 2002 Conference, Toulouse, France (Sep. 2002).

Desai et al., "Robust Subspace Learning and Detection in Laplacian Noise and Interference," IEEE Transactions on Signal Processing, 55(7):3585-3595 (2007).

Desai et al., "Subspace learning and innovation characterization in generalized Gaussian noise," IEEE 37th Asilomar Conference on Signals, Systems and Computers, Monterey, Calif. (Nov. 2003).

Desai et al., "Subspace Learning in Non-Gaussian Log-Concave Noise," Conference Record of the IEEE 38th Asilomar Conference on Signals, Systems and Computers, 2:2364-2369 (2004).

Desai, et al., "Non Gaussian Robust Matched Subspace Detectors and Signal Design Analysis for a Class of Separable Subspaces," Proceedings of the 3rd IEEE Sensor Array and Multichannel Signal Processing Workshop, Barcelona, Spain, 225-229 (Jul. 2004).

Dietterich et al., "Solving Multiclass Learning Problems via Error-Correcting Output Codes," Journal of Artificial Intelligence Research 2. 263-286 (1995).

Do et al., "Wavelet-Based Texture Retrieval Using Generalized Gaussian Density and Kullback-Leibler Distance," IEEE Transaction on Image Processing, 11(2):146-158 (2002).

Fiorin et al., "Fast adaptive axis-based segmentation of retinal vessels through matched filters," 11th Intl. Congress of the IUPESM. Medical Physics and Biomedical Engineering. World Congress 2009. Biomedical Eng. for Audiology, Ophthalmology, Emergen & Dental Medicine, pp. 145-148 (2009).

Galloway, Mary. "Texture Analysis Using Gray Level Run Lengths," Computer Graphics and Image Processing, 4:172-179 (1975).

Goh et. al., "ADRIS: An Automatic Diabetic Retinal Image Screening System." In Medical Data Mining and Knowledge Discovery, Kryzysztof Cios, ed. Springer-Verlag, 2001.

Haralick et al., "Textural Features for Image Classification," IEEE Transactions on Systems, Man and Cybernetics, SMC-3(6):610-621 (1973).

Rennie et al., "Improving Multiclass Text Classification with the Support Vector Machine," (2001).

Ricci et al., "Retinal Blood Vessel Segmentation Using Line Operators and Support Vector Classification," IEEE Transactions on Med. Imaging, 26:10(1357-1365), Oct. 2007.

(56) References Cited

OTHER PUBLICATIONS

Rifkin, Ryan Michael, "Everything Old is New Again: A Fresh Look at Historical Approaches in Machine Learning," Paper Submitted to Sloan School of Management Science (2002).

Rui et al., "Image Retrieval: Current Techniques, Promising Directions, and Open Issues,". Journal of Visual Communication and Image Representation, 10:39-62 (1999).

Shah, Jayant, "Gray Skeletons and Segmentation of Shapes," Computer Vision and Image Understanding 99 (2005).

Smith et al., "Transform Features for Texture Classification and Discrimination in Large Image Databases," Proceedings of IEEE International Conference on Image Processing, Austin, TX (Nov. 1994).

Sofka et al., "Retinal Vessel Centerline Extraction Using Multiscale Matched Filters, Confidence and Edge Measures," IEEE Trans. on Medical Imaging, 25:12(1531-1546), Dec. 2006.

Sukkaew et al., "Automatic tortuosity-based Retinopathy of Prematurity Screening System," IEICE Transactions on Information and Systems, vol. E91-D, No. 12, pp. 2868-2874 (2008).

Takahashi et al., "Decision-Tree-Based Multiclass Support Vector Machines," Proceedings of the 9th International Conference on Neural Information Processing, 3:1418-1422 (2002).

Tsai et al., "Automated Retinal Image Analysis Over the Internet," IEEE Trans. on Info. Tech. in Biomedicine, 12:4 (480-487), Jul. 2008.

Tuceryan et al., "Chapter 2.1, Texture Analysis," Handbook of Pattern Recognition and Computer Vision (2nd Edition), World Scientific Publishing Co., pp. 207-248 (1998).

Unser, Michael, "Sum and Difference Histograms for Texture Classification," IEEE Transactions on Pattern Analysis and Machine Intelligence, Pami-8(1):118-125 (1986).

Van de Wouwer et al., "Statistical Texture Characterization from Discrete Wavelet Representations," IEEE Transactions on Image Processing, 8(4):592-598 (1999).

Willsky, A., "Multiresolution Markov Models for Signal and Image Processing," Proceedings of the IEEE, 90(8):1396-1458 (2002).

Wong et al., "Automated detection of kinks from blood vessels for optic cup segmentation in retinal images," Proc. of SPIE vol. 7260, pp. 1-8 (2009).

Zana et al., "A Multimodal Registration Algorithm of Eye Fundus Images Using Vessels Detection and Hough Transform," IEEE Trans. on Medical Imaging, 18:5(419-428), May 1999.

International Search Report and Written Opinion for PCT/US2010/052950 [note that the correct publication date for Desai et al., p. 3, is May 18, 2010].

Can et al., "Automated model based segmentation, tracing and analysis of retinal vasculature from digital fundus images." State-of-The-Art Angiography, Applications and Plaque Imaging Using MR, CT, Ultrasound and X-rays (2003): pp. 1-91.

Hart, et al., "Measurement and classification of retinal vascular tortuosity," Intl. Journal of Medical Informatics, Feb.-Mar. 1999, vol. 53, pp. 239-252.

International Search Report in PCT/US2010/052950, dated Mar. 16, 2011.

International Search Report in PCT/US2011/051848 dated Feb. 21, 2012.

Office Action in U.S. Appl. No. 12/355,567 dated May 8, 2012.

Renyi, "On Measures of Entropy and Information," Proc. 4th Berkley Symp.on Math Statistics and Probability, Jun. 20-Jul. 30, 1960, U. Calif. Press, 1:547-561 (1961).

Agurto et al., "Multiscale AM-FM Methods for Diabetic Retinopathy Lesion Detection," IEEE Transactions on Medical Imaging, 29:2(502-512).

Agustin et al., "Robust Failure Detection for Reentry Vehicle Attitude Control Systems," Journal of Guidance, Control & Dynamics, 22(6):839-845 (1999).

Bovik et al., "Multichannel Texture Analysis Using Localized Spatial Filters," IEEE Transactions on Pattern Analysis and Machine Intelligence, 12(1):55-73 (1990).

Burges, C., "A Tutorial on Support Vector Machines for Pattern Recognition," Data Mining and Knowledge Discovery, 2:121-167 (1998).

Chang et al., "Texture Analysis and Classification with Tree-Structured Wavelet Transform," IEEE Transactions on Image Processing, 2(4):429-441 (1993).

Choi et al., "An Efficient and Accurate Algorithm for Extracting a Skeleton," ICPR, vol. 3, pp. 3750, 15th International Conference on Pattern Recognition (ICPR'00).

Csiszar, I., "Why least squares and maximum entropy? An axiomatic approach to inference for linear inverse problems," The Annals of Statistics, 19(4):2032-2066 (1991).

Deckert et al., "F-8 DFBW Sensor Failure Identification Using Analytic Redundancy," IEEE Transactions on Automatic Control, 22(5):795-803 (1977).

Desai et al., "Noise Adaptive Matrix Edge Field Analysis of Small Sized Heterogeneous OnionLayered Textures for Characterizing Human Embryonic Stem Cell Nuclei," IEEE International Symposium on Biomedical imaging, pp. 1386-1389 (2009).

Haralick, Robert M. "Statistical and Structure Approaches to Texture," Proceedings of the IEEE, 67(5):786-804 (1979).

Hatanaka et al., "Automated Anaysis of the Distributions and Geometries of Blood Vessels on Retinal Fundus Images," Proc. of SPIE, 5370:1621-1628 (2004).

Hermes et al. "Feature Selection for Support Vector Machines," IEEE Computer Society, 2:712-715 (2000).

Jain et al., "Unsupervised Texture Segmentation Using Gabor Filters," Pattern Recognition, 24(12):1167-1186 (1991).

Kociolek et al., "Discrete Wavelet Transform—Derived Features for Digital Image Texture Analysis," Retrieved from www.eletel.p.lodz.pl/cost.pdf_9.pdf Jul. 21, 2008.

Krupadanam et al., "Multivariable Adaptive Control Design with Applications to Autonomous Helicopters," Journal of Guidance Control and Dynamics, 25(5):843-851 (2002).

Laws, K., "Rapid Texture Identification," SPIE vol. 238 Image Processing for Missile Guidance. 376-380 (1980).

Ma et al., "A Comparison of Wavelet Transform Features for Texture Image Annotation," International Conference on Image Processing Oct. 23-25, 1995.

Mangin, J. et al., "A framework based on spin glass models for the inference of anatomical connectivity from diffusion-weighted MR data—a technical review," NMR in Biomedicine, 15:481-492 (2002).

Mangoubi et al., "A Robust Failure Detection and Isolation Algorithm," Proceedings of the 34th Conference on Decision & Control, 2377-2382 (1995).

Mao et al., "Texture Classification and Segmentation Using Multiresolution Simultaneous Autoregressive Models," Pattern Recognition, 25(2):173-188 (1992).

Mendonca et al., "Segmentation of Retinal Blood Vessels by Combining the Detection of Centerlines and Morphological Reconstruction," IEEE Transactions on Medical Imaging, 25:9(1200-1213) Sep. 2006.

Mulkern, R. et al., "Complementary aspects of diffusion imaging and fMRI; I: structure and function," Magnetic Resonance Imaging, 24(4):463-474 (2006).

Osuna, E., Support Vector Machines: Training and Applications (Mar. 1997).

Parker, G., "Analysis of MR diffusion weighted images," British Journal of Radiology, Special Issue, S176-S185 (2004).

Randen et al., "Filtering for Texture Classification: A Comparative Study," IEEE Transactions on Pattern Analysis and Machine Intelligence, 21(4):291-310 (1999).

Reed et al., "A Review of Recent Texture Segmentation and Feature Extraction Techniques," CVGIP: Image Understanding, 57(3):359-372 (1993).

Reniers et al., "Skeleton-based Hierarchical Shape Segmentation," IEEE Int. Conference on Shape Modeling and Applications, pp. 179-188 (2007).

* cited by examiner identical neighborhoods neighborhoods with variable size, identical shape neighborhoods with variable size, shape, and orientation

510

520

530

540

550

560

570

SYSTEMS AND METHODS FOR DETECTING RETINAL ABNORMALITIES

CROSS-REFERENCE TO RELATED APPLICATIONS

This application claims the benefit of U.S. Provisional Application No. 61/279,156, "Systems and Methods for Retinal Image Analysis," filed Oct. 15, 2009, and is a continuation-in-part of U.S. patent application Ser. No. 12/355,567, "Systems and Methods for Analyzing Image Data Using Adaptive Neighborhooding," filed Jan. 16, 2009, which claims the benefit of U.S. Provisional Application No. 61/021,513, "An Energy Functional Framework for Simultaneous Learning, Smoothing, Segmentation, and Grouping in a Low SNR, Sparse Data Environment," filed Jan. 16, 2008; U.S. Provisional Application No. 61/011,456, "Image-based Methods for Measuring Global Nuclear Patterns as Epigenetic Markers of Cell Differentiation," filed Jan. 16, 2008; and U.S. Provisional Application No. 61/143,399, "Image-based Methods for Assessing Cells," filed Jan. 8, 2009. Each of the foregoing is hereby incorporated by reference herein in its entirety.

STATEMENT REGARDING FEDERALLY SPONSORED RESEARCH OR DEVELOPMENT

Work described herein was funded, in whole or in part, by Grant No. RO1-EB006161-01A2 from the National Institutes of Health (NIH/NIBIB) and NINDS/NIH Grant No. 5-R01-NS34189-10 from the National Institute of Neurological Disorders and Stroke. The United States Government has certain rights in this invention.

BACKGROUND OF THE INVENTION

Diabetic retinopathy (DR) is one of several systemic diseases that attack the retina and damages it by causing lesions. The disease often has no early signs and, at a relatively advanced stage, the lesions can cause loss of vision. Diabetes affects more than 194 million individuals worldwide today, is on the rise, and is projected to claim 333 million patients by 2025. DR will affect up to 80% of patients who have diabetes for a decade or longer. DR is the leading cause of vision loss in developed countries today, is on the rise, and is projected to affect over 275 million persons worldwide.

The severity of the visual loss from diabetes can be mitigated if patients are rigorously evaluated in a timely manner. Preservation of vision necessitates lifelong care and periodic, accurate diagnosis of DR severity. Each patient should have DR severity evaluated at least once a year, requiring a worldwide minimal throughput capacity of 24 eyes per second.

There are many challenges that stand in the way of meeting this need. First, many diabetics, including 25% of the U.S. diabetic population, lack awareness of their health status. Second, a large percentage of patients, especially in developing countries, do not reside within reach of a clinical facility. Third, DR diagnosis requires special training, and many clinics do not have clinicians with such training. Finally, even if care is available and within reaching distance of an aware patient, capacity is limited, the diagnostic procedures are inconvenient and subject to human inconsistencies and error. The methods and systems described herein were inspired by these and other challenges of retinal imaging.

SUMMARY OF THE INVENTION

Described herein are systems, methods and non-transitory computer readable media for detecting retinal abnormalities. These methods are preferably implemented by a computer or other appropriately configured processing device.

In a first aspect, a computer receives an image of a retina, and smoothes and segments the image. The smoothing and segmenting may be interdependent. The computer identifies at least one retinal feature in the smoothed and segmented image, and analyzes the identified at least one retinal feature in the smoothed and segmented image to identify a retinal abnormality. In some embodiments, analyzing the identified at least one retinal feature comprises analyzing a texture of the image. In some embodiments, analyzing the identified at least one retinal feature includes determining at least one path associated with at least one blood vessel in the image, and determining a variation in at least one of an angle of orientation of the path at a location along the path and a diameter of the at least one blood vessel at a location along the path. When the variation exceeds a threshold, the computer identifies a retinal abnormality at the location. The abnormality may be, for example, a venous caliber abnormality, a new vascularity, a non-vascular abnormality such as cotton wool spots, or any other abnormality.

In some embodiments, the segmenting and smoothing includes determining an edge field strength at a plurality of locations in the image, with the at least one path is determined based at least in part on the edge field strength. Determining at least one path may include determining at least one center line associated with the at least one blood vessel in the image. Determining a variation in an angle of orientation may include determining a change in the angle of orientation between the sequential plurality of locations.

In some embodiments, the computer filters a plurality of variations. The filter may be a moving window average. In some embodiments, the variation exceeds a threshold when at least one of the filtered plurality of variations exceeds the threshold. In some embodiments, when the variation at a location exceeds a threshold, the computer determines whether a vessel bifurcation is present at the location, and, when a vessel bifurcation is present at the location, the computer filters out the variation by the computer.

In some embodiments, smoothing and segmenting includes adaptively adjusting at least one of a shape and orientation defining a neighborhood associated with a plurality of locations in the image (for example, to reduce the value of an energy function associated with an error metric). In some embodiments, smoothing and segmenting includes reducing the value of first and second energy functions, wherein the first energy function uses a first error metric and the second energy function uses a second error metric different from the first error metric. In such embodiments, the computer may combine information about first and second sets of smoothing and segmenting parameters obtained by reducing the value of the first and second energy functions, respectively.

This application also relates to U.S. patent application Ser. No. 12/321,360, now U.S. Pat. No. 7,907,769, "Image-based Methods for Measuring Global Nuclear Patterns as Epigenetic Markers of Cell Differentiation," filed Jan. 16, 2009, the entirety of which is hereby incorporated herein by reference.

BRIEF DESCRIPTION OF THE DRAWINGS

The patent or application file contains at least one drawing executed in color. Copies of this patent or patent application publication with color drawings will be provided to the Office upon request and payment of the necessary fee. The above and other features of the present invention, its nature and various advantages will be more apparent upon consideration of the following detailed description, taken in conjunction with the accompanying drawings in which.

DETAILED DESCRIPTION

To provide an overall understanding of the invention, certain illustrative embodiments will now be described, including systems and methods for information extraction from image data. However, it will be understood by one of ordinary skill in the art that the systems and methods described herein can be adapted and modified for other suitable applications and that such other additions and modifications will not depart from the scope hereof.

A. Image Analysis Systems

Figure 1:
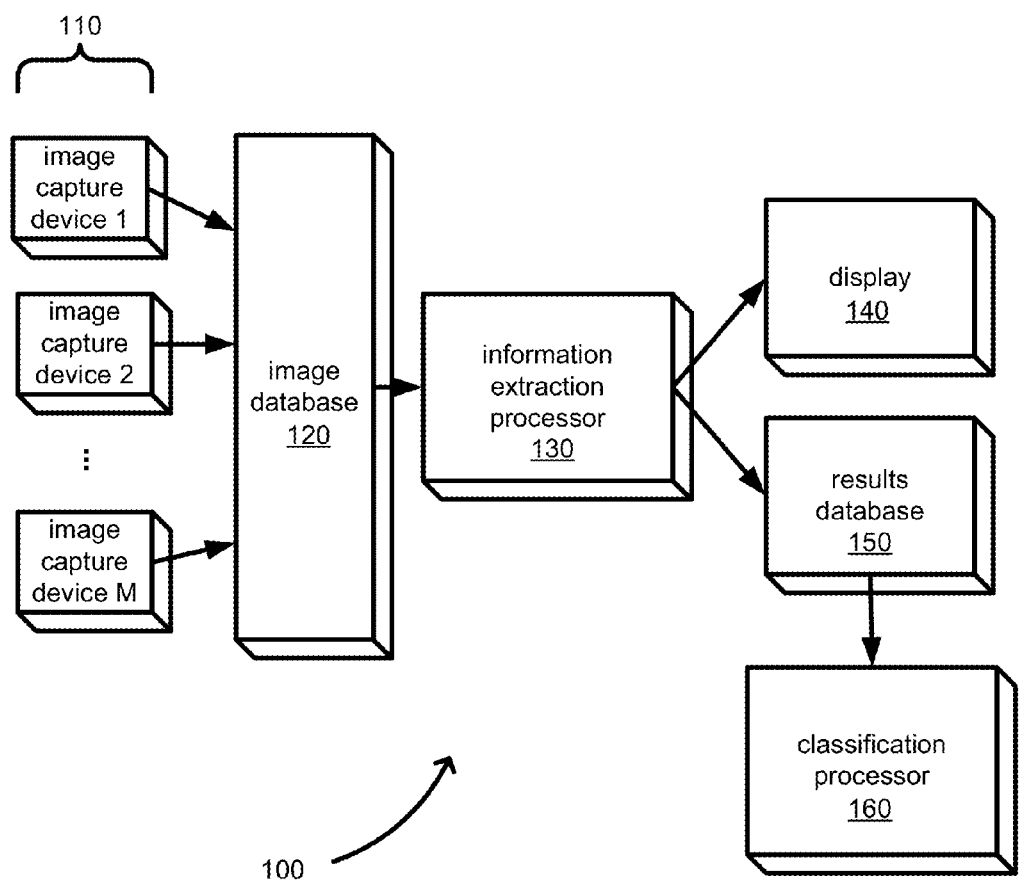
FIG. 1 is a schematic of a system for image analysis according to an illustrative embodiment of the invention.

FIG. 1 is a schematic diagram of an image analysis system, according to an illustrative embodiment of the invention. The system 100 includes image capturing devices 110, image database 120, information extraction processor 130, display 140, results database 150 and classification processor 160.

The system 100 includes at least one image capture device 110 for capturing images of a scene. Exemplary image capture devices 110 include visible light cameras and video recorders; PET, SPECT, MRI, X-ray, CT scanners and other medical imaging apparatus; bright field, phase contrast, atomic force and scanning electron microscopes; satellite radar; thermographic cameras; seismographs; and sonar and electromagnetic wave detectors. Each of the image capturing devices 110 may produce analog or digital images. The image captured by a single image capturing device 110 may be scalar-, vector- or matrix-valued and may vary as a function of time. An imaged scene can include any physical object, collection of physical objects or physical phenomena of interest for which measurements of at least one property can be obtained by an image capturing device. For example, the embryonic environment of a fetus is a scene that can be measured with an ultrasound image capture device. In another example, the position and movement of atmospheric moisture is a scene that can be measured with a satellite radar image capture device.

An image database 120 is used to store the images captured by the image capturing devices 110 as a set of image data. Image database 120 may comprise an appropriate combination of magnetic, optical and/or semiconductor memory, and may include, for example, RAM, ROM, flash drive, an optical disc such as a compact disc and/or a hard disk or drive. One skilled in the art will recognize a number of suitable implementations for image database 120 within system 100, with exemplary embodiments including a database server designed to communicate with processor 130, a local storage unit or removable computer-readable media.

Information extraction processor 130 and database 120 may be embedded within the same physical unit or housed as separate devices connected to each other by a communication medium, such as a USB port, serial port cable, a coaxial cable, a Ethernet type cable, a telephone line, a radio frequency transceiver or other similar wireless or wired medium or combination of the foregoing. Information extraction processor 130 queries database 120 to obtain a non-empty subset of the set of image data. Information extraction processor 130 also performs the information extraction processes described below. Exemplary embodiments of information extraction processor 130 include the software-programmable processors found in general purpose computers, as well as specialized processor units that can be embedded within a larger apparatus. Information extraction processor 130 performs the method described herein by executing instructions stored on a computer-readable medium; one of ordinary skill in the art will recognize that such media include, without limitation, solid-state, magnetic, holographic, magneto-optical and optical memory units. Additional embodiments of information extraction processor 130 and the remaining elements of FIG. 1 are discussed below.

At the completion of the information extraction method, or concurrently with the method, information extraction processor 130 outputs a collection of processed data. Display 140 presents the processed data visually to a user; exemplary embodiments include a computer monitor or other electronic screen, a physical print-out produced by an electronic printer in communication with information extraction processor 130, or a three-dimensional projection or model. Results database 150 is a data storage device in which the processed data is stored for further analysis. Exemplary embodiments include the architectures and devices described for image database 120, as well as others known to those skilled in the art. Classification processor 160 is a data processing device that may optionally extract the processed data from database 150 in order to classify the processed data, i.e. identify the meaning and content of elements in the imaged scene, and may be embodied by the architectures and devices described for information extraction processor 130.

Although the system components 110-160 are depicted in FIG. 1 as separate units, one skilled in the art would immediately recognize that two or more of these units could be practically combined into an integrated apparatus that performs the same overall function. For example, a single physical camera may have both visible and infrared imaging capabilities, and thus represent two image capture devices. A single image processing device may also contain a database 120 for the image data which can directly transmit to processor 130. Similarly, the database 120 and the processor 130 could be configured within a single general purpose computer, as could the processors 130 and 160. Many combinations of the system components within hardware are possible and still remain within the scope of the claimed system. The system components 110-160 can be coupled using communication protocols over physical connections or can be coupled using wireless communication protocols. In one exemplary embodiment, the image data is transmitted from remote image capture devices wirelessly or via an electronic network connection to a data processing facility, where it is stored and processed. In another exemplary embodiment, the system of FIG. 1 is deployed within a vehicle or fleet of vehicles which is capable of using the processed data to make decisions regarding the vehicle or fleet's behavior.

Returning to FIG. 1, one skilled in the art will recognize that many different embodiments of the system components 110-160 are possible, as are many different settings for the system as a whole. In one embodiment, the system of FIG. 1 resides in a laboratory or medical research setting and is used to improve patient diagnosis using image data from, for example, perfusion imaging, fMRI, multi-spectral or hyper-spectral imaging, bright field microscopy or phase contrast microscopy. In another embodiment, the system of FIG. 1 resides in a monitoring station and is used to assess conditions in a particular geographical area by combining data from at least one imaging device. These devices may include satellite radar, aerial photography or thermography, seismographs, sonar or electromagnetic wave detectors. In another embodiment, the system of FIG. 1 can be configured for any general purpose computer to meet the hardware requirements and extract information from image data arising from a user's particular application.

B. Information Extraction

Figure 2:
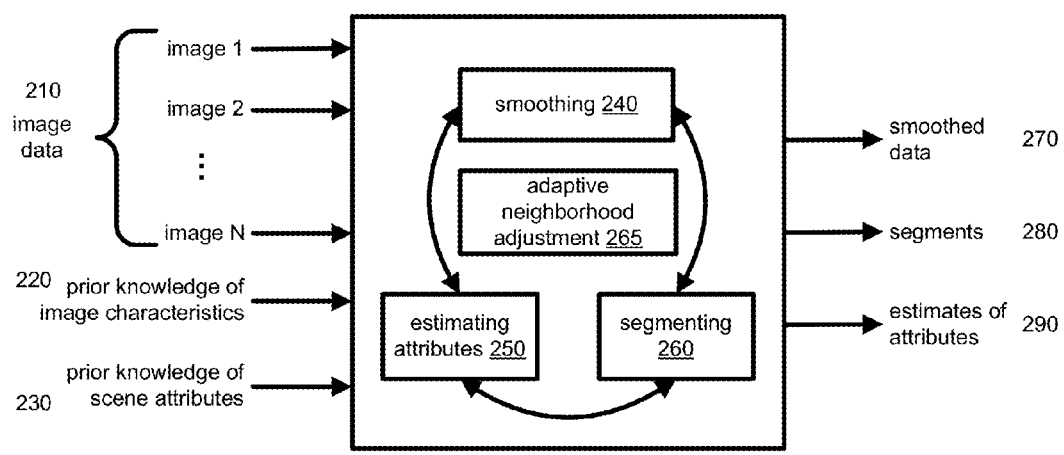
FIG. 2 is a diagram of an illustrative process for generating smoothed data, segments, and attribute estimates according to an embodiment of the invention.

The information extraction processor 130 is configured to extract information about the elements in an imaged scene by smoothing the image data to improve the representation of the scene, segmenting the image data to distinguish elements within the scene by determining edges between these elements, and estimating the attributes of the elements within the scene, using adaptively adjusted neighborhoods. FIG. 2 depicts one illustrative embodiment of the information extraction method performed by the information extraction processor 130. Inputs to the information extraction processor 130 include image data 210 comprising images 1, 2, . . . , N; prior knowledge of the characteristics of the image data 220; and prior knowledge of the attributes in the imaged scene 230. Prior knowledge of the characteristics of the image data 220 includes noise intensity and distribution information, models of the imaged scene, environmental factors, and properties of the imaging equipment. Prior knowledge of the attributes in the imaged scene 230 includes locations within the scene that have known attributes, knowledge of the presence or absence of elements within the imaged scene, real-world experience with the imaged scene, or any probabilistic assessments about the content of the imaged scene. The processes of smoothing 240, segmenting 250 and attribute estimation 260 are interdependent in the sense that the processor considers the outcome of each of these processes in performing the others. Adaptive adjustment of neighborhoods 265 will be discussed in greater detail below. In addition, the processes are carried out concurrently or substantially concurrently. At the conclusion of these processes, the information extraction processor 130 outputs a collection of processed data comprising a set of smoothed data 270, a set of segments dividing the imaged scene into coherent elements 280, and a set of estimated attributes present within the scene 290. Each of the processes 240, 250, and 260 will be discussed in more detail below.

The smoothing process 240 generates a set of smoothed data 270 from the image data. Smoothed data 270 represents the most accurate estimate of the true characteristics of the imaged scene. Images are often corrupted by noise and by distortions from the imaging equipment, and consequently, the image data is never a perfect representation of the true scene. When performing smoothing 240, the processor 130 takes into account, among other factors, the image data, physical models of the imaged scene, characteristics of the noise arising at all points between the imaged scene and the database 120, as well as the results of the segmenting process 250 and attribute estimation process 260.

The segmenting process 250 demarcates distinct elements within the imaged scene by drawing edges that distinguish one element from another. For example, the segmenting process may distinguish between an object and its background, several objects that overlap within the imaged scene, or regions within an imaged scene that exhibit different attributes. The segmenting process results in a set of edges that define the segments 280. These edges may be scalar, vector, or matrix-valued, or may represent other data types. When performing segmenting 250, the information extraction processor 130 takes into account, among other factors, the image data 210, physical models of the imaged scene, characteristics of the noise arising at all points between the imaged scene and the image database 120, as well as the results of the smoothing process 240 and attribute estimation process 260.

The attribute estimation process 260 identifies properties of the elements in the imaged scene. An attribute is any property of an object about which the image data contains some information. The set of available attributes depends upon the imaging modalities represented within the image data. For example, a thermographic camera generates images from infrared radiation; these images contain information about the temperature of objects in the imaged scene. Additional examples of attributes include texture, radioactivity, moisture content, color, and material composition, among many others. For example, the surface of a pineapple may be identified by the processor as having a texture (the attribute) that is rough (a value of the attribute). In one embodiment, the attribute of interest is the parameter underlying a parameterized family of models that describe the image data. In another embodiment, the attribute of interest is the parametric model itself. When performing attribute estimation, the information extraction processor 130 takes into account, among other factors, the image data 210, physical models of the imaged scene, characteristics of the noise arising at all points between the imaged scene and the image database 120, as well as the results of the smoothing process 240 and segmenting process 250.

When more than one image is represented in the image data, the information extraction processor 130 may also determine, for a particular attribute, the relative amounts of information contained in each image. When estimating this attribute, the information extraction processor 130 may then utilize each image according to its information content regarding the attribute. For example, multi-spectral imaging returns multiple images, each of which was produced by a camera operating in particular wavelength bands. Different attributes may be better represented in one frequency band than another. For example, satellites use the 450-520 nm wavelength range to image deep water, but the 1550-1750 nm wavelength range to image ground vegetation. Additionally, the information extraction processor 130 may use statistics of the image data to identify images of particular relevance to an attribute of interest. For example, one or more different weighted combinations of image data may be identified as having more information content as compared to other combinations for any particular attribute. The present invention allows the attribute estimation process, interdependently with the smoothing and segmenting processes, to preferentially utilize data from different images.

Additionally, the information extraction processor 130 may preferentially utilize data in different ways at different locations in the imaged scene for any of the smoothing, segmenting and attribute estimation processes. For example, if each image in a data set corresponds to a photograph of a person taken at a different angle, only a subset of those images will contain information about the person's facial features. Therefore, these images will be preferentially used by information extraction processor 130 to extract information about the facial region in the imaged scene. The information extraction method presented herein is capable of preferentially utilizing the image data to resolve elements in the imaged scene at different locations, interdependently with the smoothing, segmenting and attribute estimation processes.

It is important to note that the number of attributes of interest and the number of images available can be independent. For example, several attributes can be estimated within a single image, or multiple images may be combined to estimate a single attribute.

C. Application

Aerial Imaging

Figure 3:
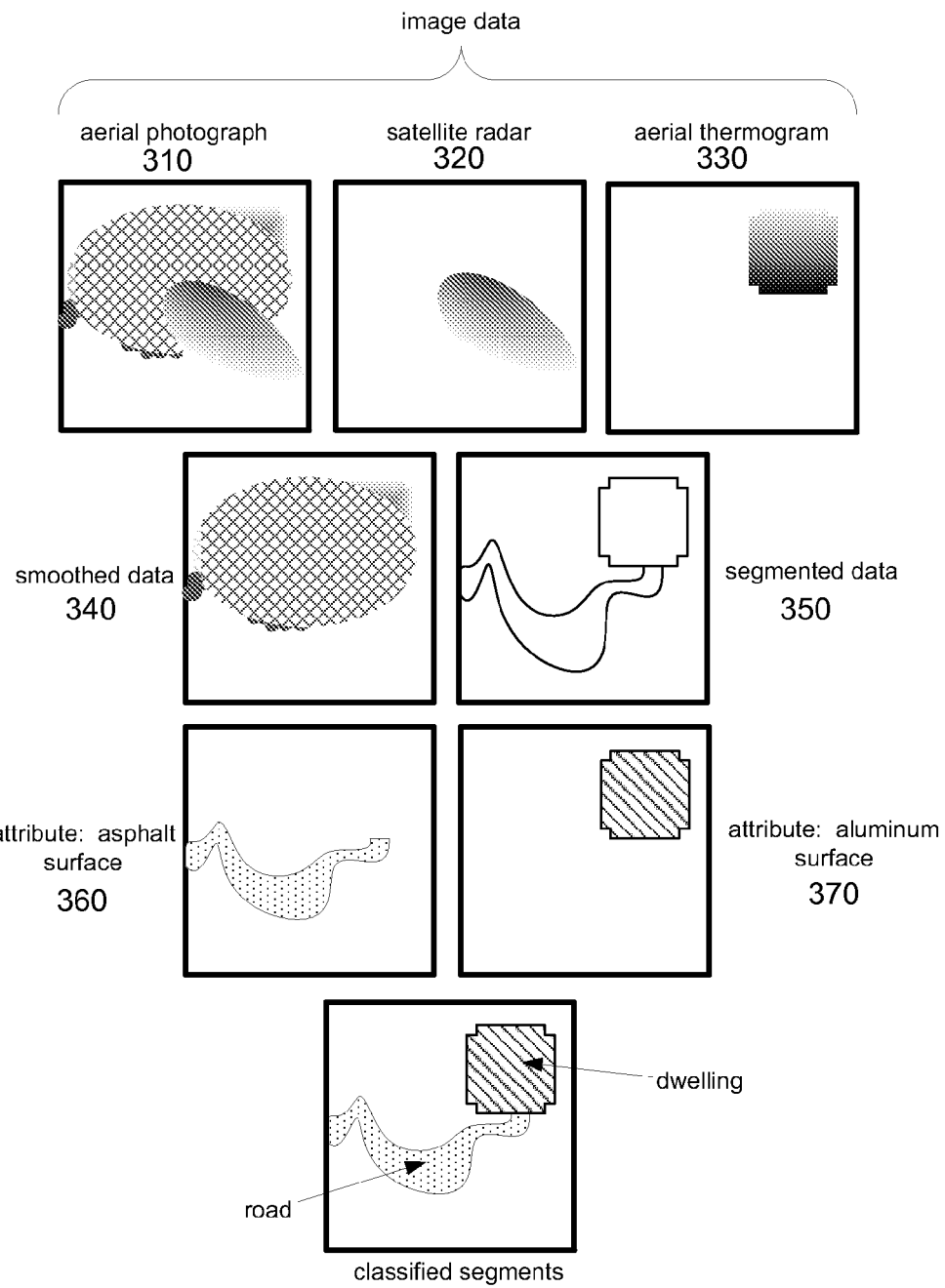
FIG. 3 illustrates the information extraction method as applied to example image data in accordance with an embodiment of the invention.

To more clearly describe the information extraction method, an example is helpful. FIG. 3 depicts three images 310, 320, 330 for processing by the image analysis system of FIG. 1 according to the methodology of FIG. 2. These three images represent the same scene; image 310 is an aerial photograph, image 320 is a satellite radar image of cloud cover, and image 330 is an aerial thermogram (which measures the thermal radiation emitted by elements in the scene). These three images represent three different imaging modalities, i.e. ways of capturing information about a scene, and are therefore capable of detecting more kinds of phenomena than a single modality. In the example, image 320 shows the presence of a cloud. Image 330 reveals an area of high thermal radiation, which may be characteristic of a dwelling within the scene. A dwelling is difficult to detect in image 310 because it is obscured by foliage and cloud cover. One of the strengths of the present information extraction method is the ability to combine multiple modalities to best reveal the underlying elements in the scene. The combination of different modalities will be discussed in more detail below.

Information extraction processor 130 obtains these three images from database 120, then outputs a set of smoothed data 270, a set of segments within the scene 280, and an estimate of the attributes within the scene 290. If the objective is to obtain the truest representation of the structures on the ground, the set of smoothed data 270 may be as depicted in illustration 340. To generate smoothed data 270, the information extraction processor 130 has removed the obscuring foliage and used the information about cloud cover from image 320 and the potential presence of a dwelling from image 330 to produce a clearer illustration of the ground structures. Segmenting the image data may result in the set of segmented data 280 depicted in illustration 350, where the outlines of the dwelling and a road are identified. Depending upon the interests of the user, information extraction processor 130 may also smooth and segment additional elements within the scene, such as the foliage in image 310 or the cloud in image 320. Information extraction processor 130 may also identify the materials used to construct each of the dwelling and road via the attribute estimation process 260 as depicted in illustration 360. As discussed in more detail below, the attribute estimation process 260 may use different neighborhoods via the adaptive neighborhood adjustment process 265 to identify the "asphalt" and "aluminum" surfaces within the imaged scenes. Once the processed data is available, classification processor 160 may be used to classify the elements in the imaged scene; for example, illustration 370 identifies a "road" and a "dwelling" within the imaged scene, using the results of all of the smoothing, segmenting and attribute estimation processes 240-260. Additional embodiments of the smoothing, segmenting and attribute estimation processes 240-260 are described below.

D. Adaptive Neighborhooding

When producing a set of smoothed data 270 from noisy images, or classifying segments according to their attribute values, it is desirable to be able to distinguish which locations within the imaged scene correspond to edges and which do not. When an edge is identified, the information extraction processor 130 can then treat locations on either side of that edge and on the edge itself separately, improving smoothing and classification performance. It is desirable, then, to use local information preferentially during the smoothing, segmenting and attribute estimation processes. Thus, in one embodiment, decisions are made at each location based on a neighborhood of surrounding locations in an adaptive neighborhood adjustment process 265. One embodiment of the present invention associates a neighborhood with each particular location in an imaged scene. Each neighborhood includes a number of other locations near the particular location. Information extraction processor 130 can then use the neighborhood of each location to focus the smoothing, segmenting and attribute estimation processes 240-260 to more appropriately extract information about the location. In its simplest form, the neighborhoods associated with each location could have a fixed size, shape and orientation, e.g. a circle with a fixed radius. However, using an inflexible neighborhood size and shape has a number of drawbacks. For example, if a location is located on an edge, then the smoothing and attribute estimation processes that rely on the fixed neighborhood will use information from the scene elements on either side of the edge, leading to spurious results. One improvement is adjusting the size of the neighborhood of each location based on local information. A further improvement comprises adjusting the size, shape and orientation of the neighborhood of a location to better match the local characteristics in an adaptive neighborhood adjustment process 265. These examples will be described in greater detail below.

In one embodiment, information extraction processor 130 performs the information extraction method while adjusting the size, shape and orientation characteristics of neighborhoods surrounding locations in the imaged scene. In particular, the processor 130 adapts the characteristics of the neighborhoods associated with each location interdependently with the smoothing, segmenting and attribute estimation processes 240-260. In another embodiment, the information extraction processor 130 utilizes separate independently adapted neighborhoods for each attributed analyzed by the information extraction processor 130.

Figure 4A:
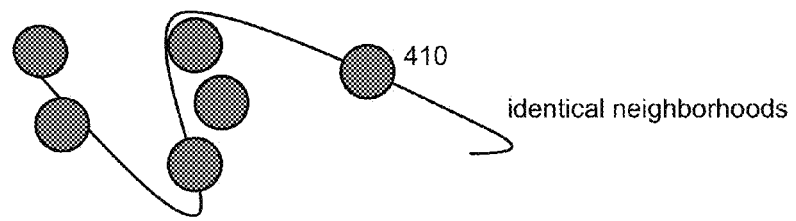
FIGS. 4A-4C depict three different approaches to neighborhood adaptation according to an illustrative embodiment of the invention.
Figure 4B:
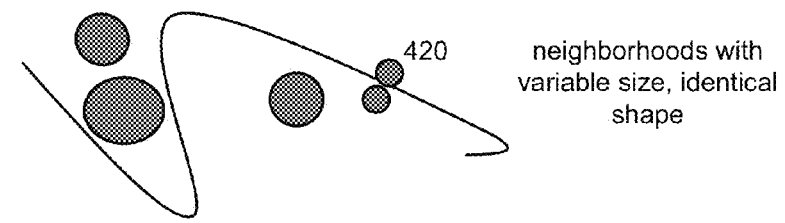
Figure 4C:
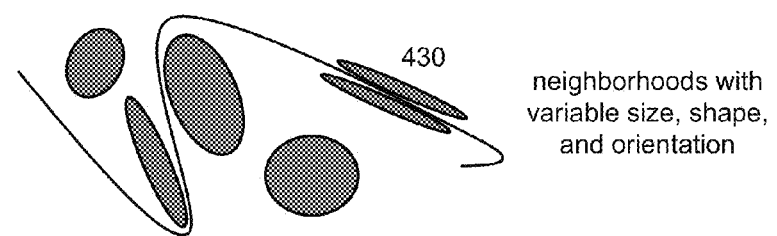

The benefits of using adaptive neighborhood size, shape and orientation can be seen in FIGS. 4A-4C and FIG. 5. FIGS. 4A-4C illustrate three different neighborhood-based approaches. Each example FIG. 4A-4C depicts an edge and several illustrative neighborhoods 410-430 at corresponding locations. The first example illustrates an approach in which the neighborhoods 410 associated with each location in the imaged scene are identical. In FIG. 4A, all neighborhoods 410 are circles centered at the location with a fixed radius. In FIG. 4B, all neighborhoods 420 are circular, but with radii that are allowed to vary in order to avoid a neighborhood 420 overlapping an edge. In FIG. 4C, an exemplary embodiment of the invention, neighborhoods 430 are ellipses which are allowed to vary in their size, shape and orientation to better adapt to the characteristics of the local area, with the adaptation occurring interdependently with the smoothing process.

To demonstrate the improvement that such adaptation can provide, consider an exemplary embodiment of the information extraction method which includes an averaging step within the smoothing process 240 to reduce noise present in the raw image data. The averaging step produces a smoothed data value at each location (with an associated neighborhood) by replacing the image data value at that location with the average of the image data values at each of the locations that fall within the associated neighborhood.

With reference to FIGS. 4A-4C, this averaging will take place over the indicated neighborhoods 410-430. In FIG. 4A, averaging will occur over edge values and across segments, blurring the distinction between segments. A mathematical formulation in accordance with the neighborhood 410 is given by $$\min_{u} \int_R (\alpha u_X^T u_X + \beta(u-g)^2) dX \qquad (1)$$

wherein g is the image data, u is the smoothed data, $\alpha$, $\beta$ are adjustable parameters and the integral is taken over all locations X in region R.

In FIG. 4B, locations near the edge have associated neighborhoods 420 that are necessarily small to avoid overlapping an edge, and thus are more susceptible to noise. A mathematical formulation in accordance with the neighborhood 420 is given by $$\min_{u,v} \int_R \left[ \alpha(1-v)^2 u_X^T u_X + \beta(u-g)^2 + \frac{\rho}{2} v_X^T v_X + \frac{v^2}{2\rho} \right] dX \qquad (2)$$

wherein g is the image data, u is the smoothed data, v is the edge values and $\alpha$, $\beta$, $\rho$ are adjustable parameters. A method related to that illustrated in FIG. 4B was used to analyze diffusion tensor imaging data of the human brain by Desai et al. in "Model-based variational smoothing and segmentation for diffusion tensor imaging in the brain," Neuroinformatics, v. 4 2006, which is hereby incorporated by reference herein in its entirety.

In FIG. 4C, where size, shape and orientation are allowed to vary, averaging across an edge is prevented while allowing each location to selectively identify a neighborhood 430 over which to average, improving noise-reduction performance. A mathematical formulation in accordance with the neighborhood 430 is given by $$\min_{u,V,w} \int_R \left[ \alpha u_X^T (I-V)^2 u_X + \beta(1-w)^2 \|u-g\|_2^2 + \frac{\rho}{2} F(V_X) + \frac{G(V)}{2\rho} + \frac{\rho_w}{2} w_X^T w_X + \frac{w^2}{2\rho_w} \right] dX \qquad (3)$$

wherein g is the image data, u is the smoothed data; V is a symmetric, positive-definite 2×2 matrix representing the neighborhood; w weights the data fidelity terms; F and G are functions, and $\alpha$, $\beta$, $\rho$, $\rho_w$ are adjustable parameters. The information extraction processor 130 can also use information arising from the smoothing and attribute estimation processes 150-160 to adjust the size, shape and orientation of neighborhoods.

E. Example

Noisy Images

Figure 5:
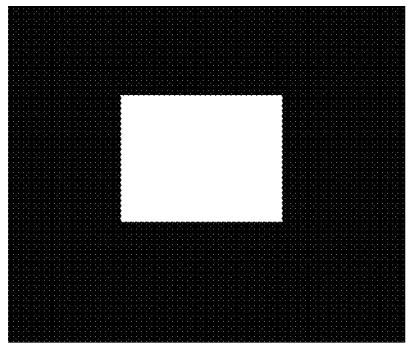
FIG. 5 demonstrates the improvements achievable by the invention in the detection of image elements in the presence of noise.
Figure 5:
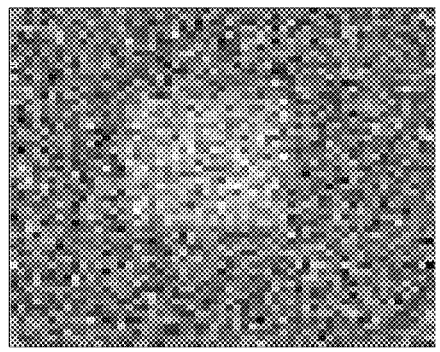
Figure 5:
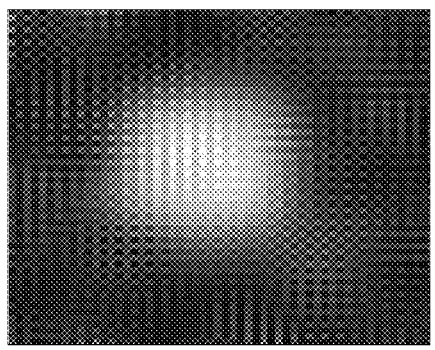
Figure 5:
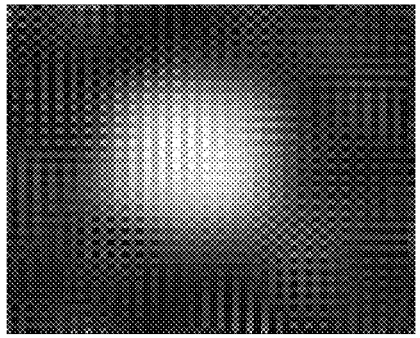
Figure 5:
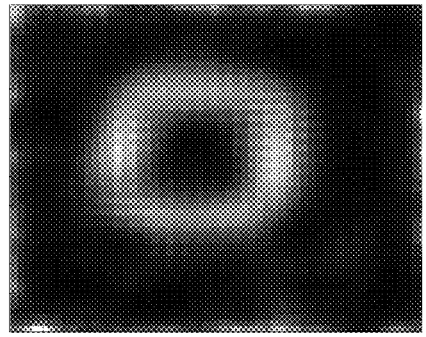
Figure 5:
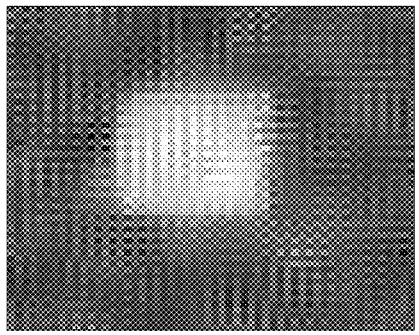
Figure 5:
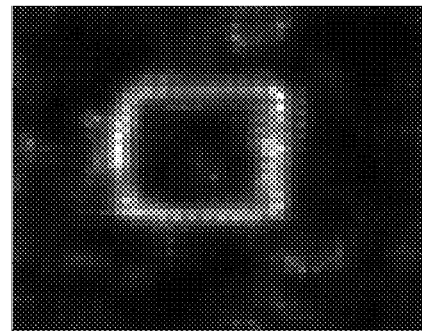

FIG. 5 demonstrates the performance improvements achievable with adaptive neighborhoods like the third neighborhood 430 as illustrated in FIG. 4C. An original scene of a white square on a black background 510 is corrupted by noise in the imaging process, resulting in a noisy image 520. In the noisy image 520, it is difficult to distinguish the square from the background with the human eye. The smoothing method of the first example 410 is applied to generate a first smoothed image 530. This method does not produce a set of edges, and the resulting smoothed data blurs the boundaries of the white rectangle. The smoothing method of the second example 420 is applied to generate a second smoothed image 540 and a set of scalar edges 550. To the human eye, the second smoothed image 540 is as indistinct as the first smoothed image 530, and the scalar edges 550 are diffuse.

The smoothing method of the third example 430, an exemplary embodiment of the invention, results in the third smoothed image 560 and a matrix-valued edge associated with each pixel. Because the edges are matrix-valued, it is not possible to represent them in the same manner as the set of scalar edges 550. One meaningful scalar value associated with the edge matrix is its trace, and therefore the third example 410 can be associated with the set of traces of the matrix-valued edges 570. Additional embodiments of the invention include examining functions of the eigenvalues and eigenvectors of a matrix-valued edge for boundary information. The third smoothed image 560 is much sharper than the first or second smoothed images 530 and 540, and the boundary much more clearly delineated by the set of traces of the matrix-valued edges 570 than the set of scalar edges 550. The ability of the third example to adapt the size, shape and orientation of the neighborhood interdependently with the smoothing process allows for the improved information extraction performance demonstrated in FIG. 5.

F. Energy Functional Approach

Figure 6:
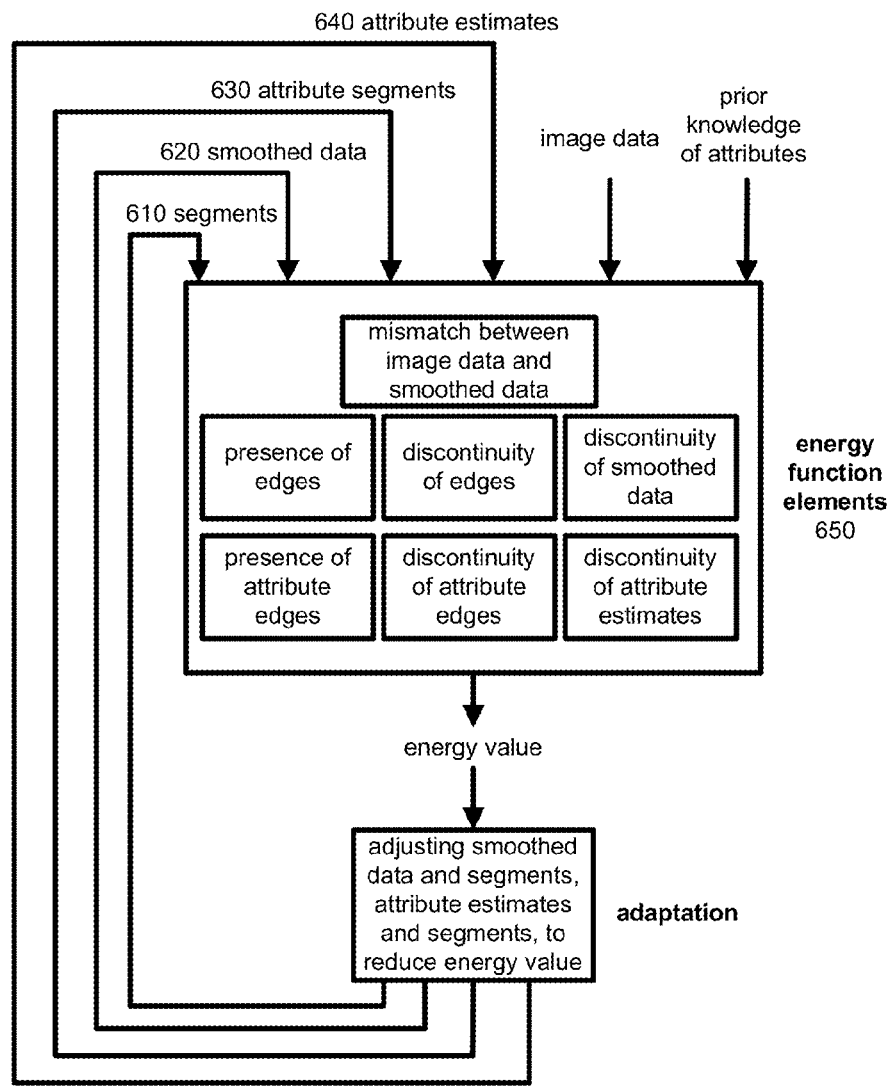
FIG. 6 illustrates a method for generating smoothed data, segments and attribute estimates by minimizing an energy function according to an illustrative embodiment of the invention.

One particular embodiment of the information extraction method is illustrated in FIG. 6. As discussed above, the neighborhood adaptation process can take place for each of the attributes of interest. At each location, a different neighborhood can be determined for each attribute, which allows the identification of attribute values and attribute edge values for each attribute. FIG. 6 depicts an iterative process which takes as inputs the image data, prior knowledge of attributes, segments (and associated edges) within the image data 610, smoothed image data 620, segments (and associated edges) within the attribute estimates 630, and attribute estimates 640. To begin to apply the iterative process of FIG. 6, initial values for the inputs 610, 620, 630 and 640 can be specified by a user or automatically selected by the processor 130. The adaptation process seeks to minimize an energy function which includes penalties for undesirable performance. Several example penalties that could be included in the energy function are depicted in energy function elements block 650. These include penalties for mismatch between image data and smoothed data; penalties for the designation of excessive edges within the data; penalties for the designation of excessive edges within the attribute; penalties for the discontinuity or non-smoothness of edges within the data; penalties for the discontinuity or non-smoothness of edges within the attribute; discontinuity or abrupt changes in the smoothed data; and discontinuity or abrupt changes in attribute estimates. Using the inputs to the energy function, an energy value can be calculated, then inputs 610, 620, 630 and 640 are adaptively adjusted to achieve a lower energy value.

In one implementation of this embodiment, the determination of the energy value is calculated in accordance with the following expression:

$$\min_{u, v_u, \theta, v_\theta} \int\int [e_1 + e_2 + e_3 + e_4 + e_5] \partial x \partial y \quad (4)$$

where $e_1$, $e_2$, $e_3$, $e_4$, $e_5$ are error terms as described below. Values for the smoothed data u, the edges of the segments $v_u$, attribute $\theta$ and the edges of the attribute segments $v_\theta$, are chosen for each (x, y) coordinate in order to minimize the expression contained in square brackets, integrated over the entire plane. This expression relies on the image data g, a data function $T(\theta)$ with attribute $\theta$, and parameters $\lambda_u$, $\alpha_u$, $\rho_u$, $\lambda_\theta$, $\alpha_\theta$, $\rho_\theta$, where $$e_1 = |g - T(\theta)u|^2,$$
$$e_2 = \lambda_u |\nabla u|^2 (1 - v_u)^2,$$
$$e_3 = \alpha_u \left( \rho_u |\nabla v_u|^2 + \frac{v_u^2}{\rho_u} \right),$$
$$e_4 = \lambda_\theta |\nabla \theta|^2 (1 - v_\theta)^2, \text{ and}$$
$$e_5 = \alpha_\theta \left( \rho_\theta |\nabla v_\theta|^2 + \frac{v_\theta^2}{\rho_\theta} \right).$$

The term $e_1$ is a penalty for a mismatch between the image data and the smoothed data, the term $e_2$ is a penalty for discontinuity in the smoothed data, the term $e_3$ includes penalties for the presence of an edge and the discontinuity of the edge, the term $e_4$ is a penalty for discontinuity in the attribute estimate and the term $e_5$ includes penalties for the presence of an attribute edge and the discontinuity of the attribute edge. One skilled in the art will recognize that there are many additional penalties that could be included in the energy function, and that the choice of appropriate penalties depends upon the application at hand. Equivalently, this problem could be expressed as the maximization of a reward function, in which different reward terms correspond to different desirable performance requirements for the information extraction method. There are many standard numerical techniques that could be readily applied to this specific mathematical formulation by one skilled in the art: for example, gradient descent methods. These techniques could be implemented in any of the embodiments described herein.

In another embodiment, the calculation of the minimum energy value is performed in accordance with the following expression:

$$\min_{u, w, v_m, v_u, v_c, \theta_u, \theta_m} \int \ldots \int\int [e_1 + e_2 + e_3 + e_4 + e_5] \partial x_1 \partial x_2 \ldots \partial x_N \partial t \quad (5)$$

where $e_1$, $e_2$, $e_3$, $e_4$, $e_5$ are error terms as described below. Values for the smoothed data u, the edges of the segments w, the edge field of the measurement model parameters $v_m$, the edge field of the process model parameters $v_u$, the edge field of the measurement model parameters $v_m$, the edge field of the process parameter correlations $v_c$, the process model parameters $\theta_u$, and the measurement model parameters $\theta_m$ are chosen for each $(x_1, x_2, \ldots, x_N, t)$ coordinate in order to minimize the expression contained in square brackets, integrated over the entire N-dimensional image data space augmented with a one-dimensional time variable. The error terms are given by $$e_1 = \beta M(u, g, w, \theta_m),$$
$$e_2 = \alpha_m L_m(\theta_m, v_m)$$
$$e_3 = \alpha_u C_u(u, v_u, \theta_u),$$
$$e_4 = \alpha_c L_c(v_c, \theta_u), \text{ and}$$
$$e_5 = \pi(u, w, v_m, v_u, v_c, \theta_u, \theta_m)$$

where M is a function that measures data fidelity, $L_m$ estimates measurement model parameters, $C_u$ measures process model spatial correlation, $L_c$ estimates process model parameters, $\pi$ represents prior distributions of the unknown variables and $\beta$, $\alpha_m$, $\alpha_u$, $\alpha_c$ are parameters that allow the process to place different emphasis on the terms $e_1$, $e_2$, $e_3$, $e_4$.

G. Retinal Imaging

As described above, the present need for accurate, fast and convenient diagnosis of retinal abnormalities is acute. To address this need, described herein are automated classification and decision support methods and systems that analyze retinal images and can provide a clinically-validated determination of retinopathy severity to help moderately skilled clinicians efficiently assess retinal disease in large numbers of patients worldwide. These systems and methods have been developed to address a number of the particular challenges of retinal abnormality detection, including:

1. Abnormalities in a vessel are relative to that particular vessel's geometry elsewhere along the vessel;
2. Abnormal features are nonlinear functions of the vessel geometry;
3. Abnormalities may be subtle, and easily camouflaged by noise and imaging artifacts; and
4. Retinal images typically have low signal to noise (SNR) characteristics that vary spatially over the vessel and retinal background.

Retinal abnormalities that are detected by the techniques disclosed herein include venous caliber abnormalities (VCABs), new vascularities in the optical disc (NVDs), new vascularities elsewhere (NVEs), intraretinal microvascular abnormalities (IRMAs), microaneurysms and pre-retinal and vitreous hemorrhages. Each of these abnormalities is classified in the Early Treatment Diabetic Retinopathy Study diagnosis guidelines used by practitioners. For example, VCABs are deformations, both subtle and abrupt, of blood vessels in the retina. In some patients, VCABs present as blood vessel lesions in which the size and orientation of the blood vessel change abruptly or slowly. In order to accurately detect and classify VCABs and other abnormalities, a clinician or automated decision system is aided by reliable determination of the vessel boundaries, size and orientation. The systems and techniques for retinal abnormality detection described herein address the particular challenges of this application, and others, by building on the smoothing and segmenting approach described above.

Systems and methods for retinal abnormality detection are now discussed. In retinal imaging applications, the components of the image analysis system 100 of FIG. 1 may be selected to be suitable for retinal imaging. For example, the image capture device 110 of the system 100 may be an analog or digital fundus camera which is capable of imaging the interior surface of the eye (e.g., the retina, optic disc, macula and posterior pole). The image capture device 110 may be used with light of one or more wavelengths, and may include optical filters for passing or blocking different wavelengths of interest (e.g., passing fluorescent colors during angiography). Fundus cameras may be used in mydriatic diagnoses, in which a patient's eye is dilated with eye drops prior to imaging, or in non-mydriatic diagnoses. As described above with reference to FIG. 1, the image captured by the image capturing device 110 may be scalar-, vector- or matrix-valued and may vary as a function of time. Retinal images can be stored in an image database 120 for real-time or later processing, analysis and review by information extraction processor 130, display 140, and results database 150 (FIG. 1). These components can take the form of any of the embodiments described herein. The information extraction processor 130 is configured to perform any one of more of the retinal abnormality detection techniques described herein.

Figure 7:
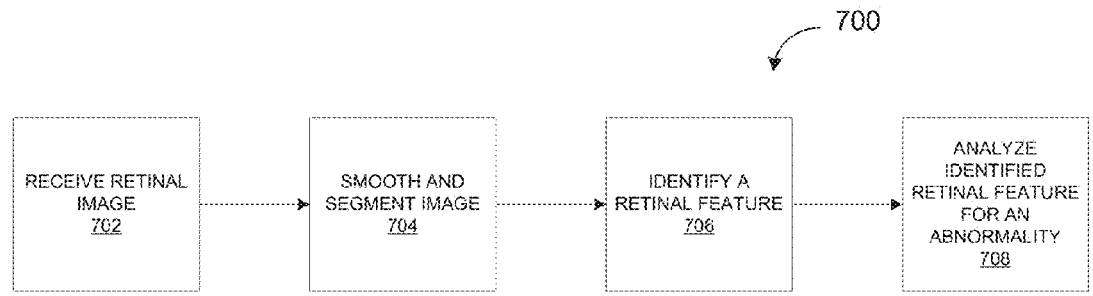
FIG. 7 is a flow diagram of a technique for detecting retinal abnormalities in accordance with an embodiment.

FIG. 7 is a flow diagram of illustrative steps in a technique 700 for detecting retinal abnormalities in accordance with an embodiment. Technique 700 may be implemented by any suitable processing device (executing, for example, non-transitory computer-readable media) included in (or in remote communication with) the image analysis system 100, such as the information extraction processor 130 of FIG. 1. For ease of illustration in the following description, technique 700 will be described as executed by the imaging analysis system 100. At step 702, the system 100 receives an image of a retina. The retinal image may come from any suitable source, such as the image capture device 110 described above. The retinal image received at step 702 is preferably digital, but may be an analog image that is subsequently digitized.

At step 704, the system 100 performs a smoothing and segmenting technique, which may take the form of any of the smoothing, segmenting and attribute estimation techniques described herein. As described above, the smoothing and segmenting operations in these techniques may be interdependent and performed substantially simultaneously (e.g., in frequent alternating iterations). In some embodiments, the segmenting and smoothing technique performed at step 704 involves determining a smoothed image and/or an edge field strength at a plurality of locations in the image. The edge field may be a scalar-valued edge field (e.g., as illustrated in Eq. 1), a vector-valued edge field (e.g., as illustrated in Eq. 2), a matrix-valued edge field (e.g., as illustrated in Eq. 3), or any combination thereof. In some embodiments, the smoothing and segmenting technique performed at step 704 includes adaptively adjusting at least one of a shape and orientation defining a neighborhood associated with a plurality of locations in the image. In any of these embodiments, the system 100 may perform the segmenting and smoothing technique to reduce the value of an energy function associated with an error metric, as discussed above. A detailed description of several particular embodiments of step 704 follows.

In some embodiments, each location in the image is associated with a elliptical neighborhood over which the image is smoothed and an edge field estimated, and the size, shape and orientation of the neighborhood vary from location to location. The neighborhoods of locations identified as edges (e.g., blood vessel edges) are adaptively reduced in size to limit the "blurring" of the edge by smoothing across the edge (e.g., as illustrated in FIG. 4C). This formulation can be expressed as:

$$\min_{u,V} \int_R \left[ \alpha u_X^T (1-V)^2 u_X + \beta(u-g)^2 + \frac{\rho}{2} F(V_X) + \frac{G(V)}{2\rho} \right] dX \quad (6)$$

wherein g is the retinal image data output by the image capture device 110, u is the smoothed data, V is a 2×2 symmetric edge matrix field, X is the image over which the smoothing and segmenting takes place, and α, β, ρ are adjustable parameters. As described above, the first term can be interpreted as a smoothness fidelity term that penalizes the gradient of u by I−V, so that smoothing occurs primarily based on pixels situated in the neighborhood. The second term is a data fidelity term penalizing deviations of the smoothed image data from the input image data. The scalar term G(V) penalizes edge strength, while $F(V_X)$ balances a preference for smooth edges while recognizing the "kinks" that are sometimes characteristic of VCABs. While any numerical technique may be used to solve Eq. 6 for any particular image and parameter values, one approach includes the use of the Euler-Lagrange equations that form the basis of the solution. For Eq. 6, the Euler-Lagrange equations are:

$$\nabla((I-V)^T(I-V)u_X) - \frac{\beta}{\alpha}(u-g) = 0 \quad (7)$$

$$\sum_{i=1}^{2} \frac{\partial}{\partial x_i}\left(\frac{\partial F(V_X)}{\partial V_{X_i}}\right) -$$

$$\frac{\alpha}{\beta}[(I-V)u_X u_X^T + u_X u_X^T(I-V)] + \frac{1}{\rho^2}\frac{\partial G(V)}{\partial V} = 0 \quad (8)$$

In some embodiments, the smoothing and segmenting performed by system 100 at step 704 includes combining the results of two or more different energy functional formulations. For example, a first energy functional formulation may take the form of Eq. 2 above; system 100 may perform any of the computational techniques described herein to determine the value of parameters u and V. Next, system 100 may apply a second energy functional formulation that uses a different error metric than the first energy functional formulation, such as $$\min_{u,v} \int_R \left[ \alpha(1-v)^2 \|u_X\|_1 + \beta \|u - g\|_1 + \frac{\rho}{2} v_X^T v_X + \frac{v^2}{2\rho} \right] dX, \quad (9)$$

which includes a 1-norm on the smoothing and data fidelity terms instead of the 2-norm used in Eq. 2. In other embodiments, the energy functional formulations of any of Eqs. 1 and 3-6 may be used with different error metrics.

Figure 9A:
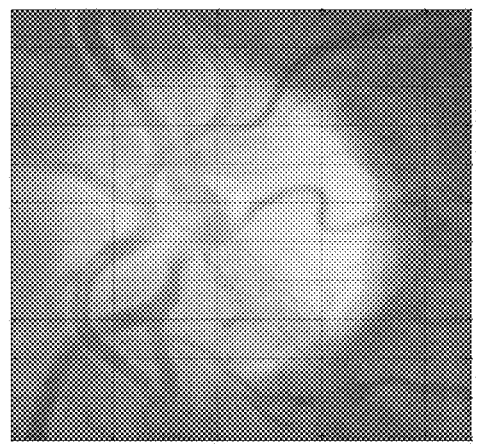
FIGS. 9A-9C illustrate edge detection using different energy functional formulations in accordance with an embodiment.
Figure 9B:
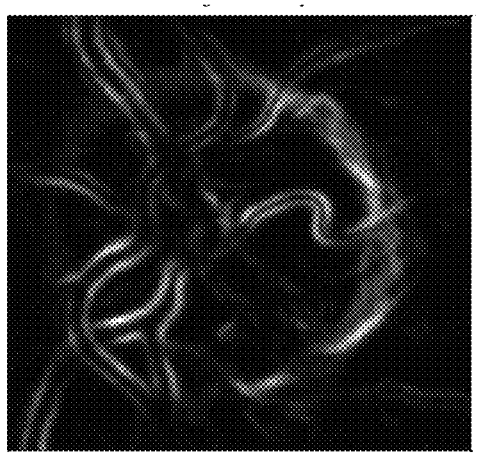
Figure 9C:
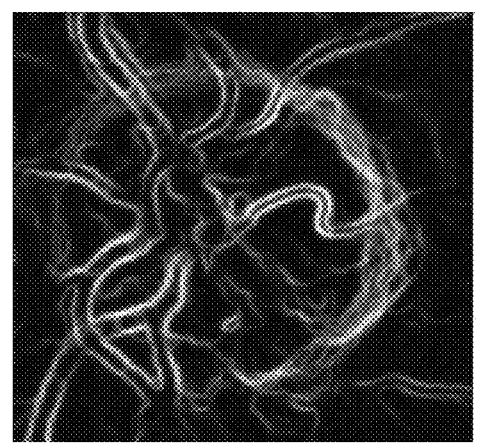

The different smoothing and segmentation results generated by the different energy functional formulations of Eqs. 2 and 9 are illustrated in FIGS. 9A-9C. FIG. 9A is a portion of a color fundus image. FIG. 9B depicts the edges of FIG. 9A determined in accordance with the energy functional formulation of Eq. 2. FIG. 9C depicts the edges of FIG. 9A determined in accordance with the energy functional formulation of Eq. 9. FIG. 9B exhibits more smoothing and stronger dominant edges, while FIG. 9C exhibits less smoothing and retains fainter edges. Once system 100 has determined smoothing and segmenting parameters that minimize the two different energy functionals, system 100 may combine the information about the two sets of differently-extracted attributes of smoothed data and edge data. This combination can enable the detection of lesions based on both the reinforcing and differentiation of spatial and strength characteristics of the two sets of attributes. In some applications, detection may be aided by prior knowledge of the different classes of lesions that may be present, as well as the spatial variation of attributes relative to the other parts of the retinal image for the same patient, or for a population of patients. In some embodiments, both formulations may be used to detect fainter vessels, such as those that arise from certain retinal abnormalities. In particular, strong and weak contrast edges can be combined using higher-order logic to determine the presence of neovascularization (NVDs and NVEs), IRMAs and candidate microaneurysms. Additionally, in some embodiments, the energy functional formulation implemented by system 100 to perform the segmenting and smoothing of step 704 (FIG. 7) includes two or more different error metrics for evaluating the different terms within a single energy functional formulation (e.g., the smoothing and data fidelity terms)

Figure 10A:
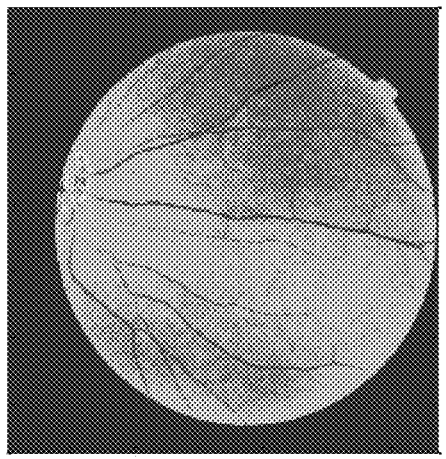
FIGS. 10A-10C illustrate the processing of a retinal image in accordance with an embodiment.
Figure 10B:
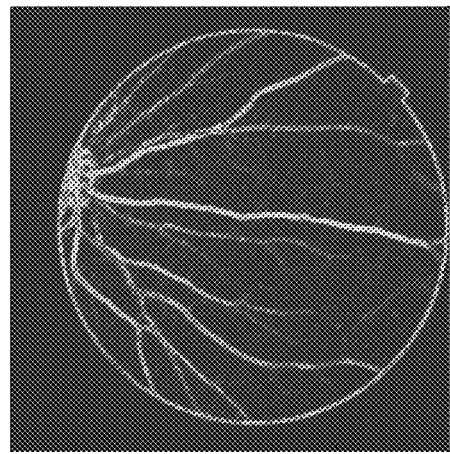
Figure 10C:
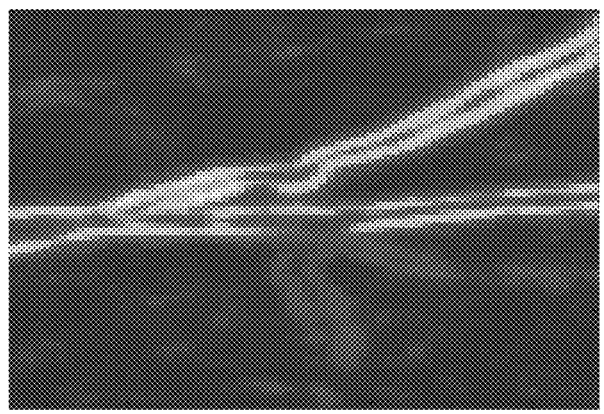
Figure 11A:
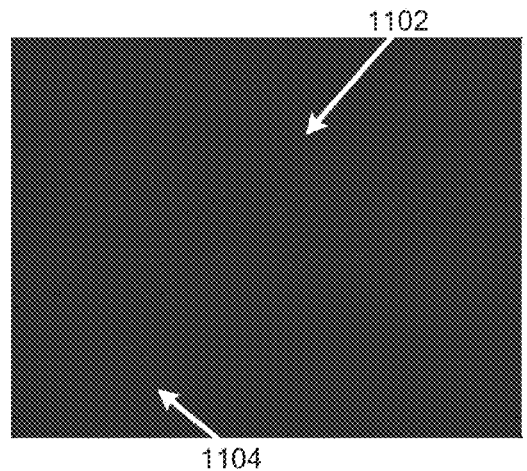
FIGS. 11A-11C illustrate a blood vessel identification technique in accordance with an embodiment.
Figure 11B:
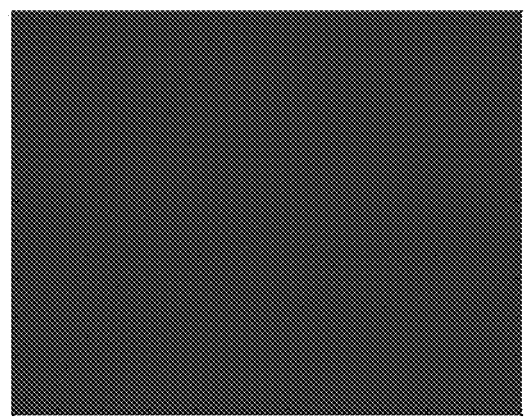
Figure 11C:
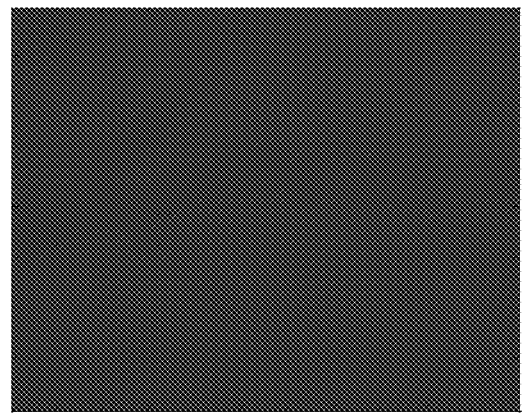

After the system 100 performs smoothing and segmenting at step 704, the system 100 identifies at least one retinal feature (such as a blood vessel) in the smoothed and segmented image (step 706). FIGS. 10A-10C depict an unprocessed retinal fundus image (FIG. 10A), a processed image that has undergone smoothing and segmenting per step 704 (FIG. 10B), and a close-up of a portion of the image of FIG. 10B that includes a blood vessel candidate (FIG. 10C). A number of techniques may be used to identify retinal features in the smoothed and segmented image of FIGS. 10B and 10C. A preferred retinal feature identification technique is illustrated in FIGS. 11A-11C. FIG. 11A depicts the locations in the processed image of FIG. 10C at which the edge value exceeds a threshold. In preferred embodiments, the threshold used is adaptively determined for each location by determining the average edge value in a local neighborhood of the location (which may be the same neighborhood used for smoothing and segmenting). FIG. 11A provides a first approximation of the boundaries of retinal features, but includes several extraneous boundaries (such as boundaries 1102 and 1104). The system 100 is configured to apply an "opening" morphological technique to the image of FIG. 11A, which removes or reduces the extraneous boundaries, resulting in the image of FIG. 11B. Examples of such techniques are described in Matheron et al., "The Birth of Mathematical Morphology," available at http://cmm.ensmp.fr/~serra/pdf/birth_of_mm.pdf, last accessed Oct. 13, 2010 and incorporated by reference herein in its entirety. The system 100 can then use the improved boundaries of FIG. 11B to fill in the portion of the image that corresponds to a retinal feature as shown in FIG. 11C.

Figure 12A:
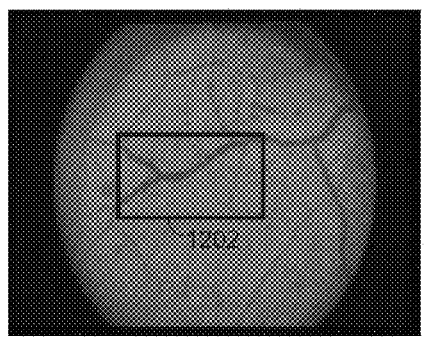
FIGS. 12A-12D illustrate a vessel path detection technique in accordance with an embodiment.
Figure 12B:
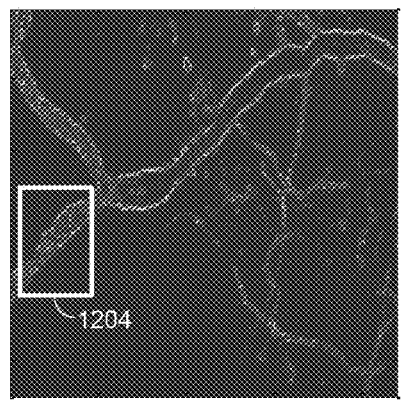
Figure 12C:
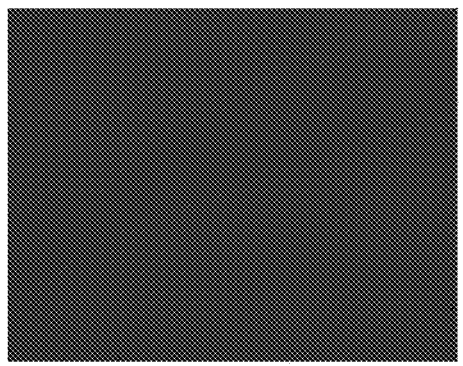
Figure 12D:
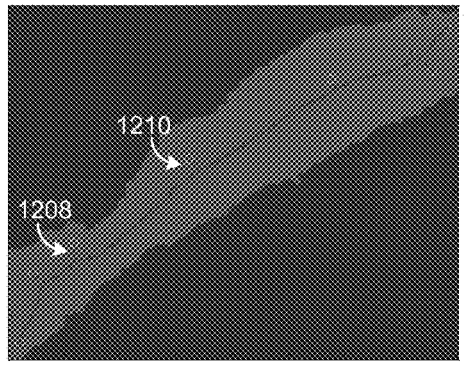

The system 100 may also be configured to determine at least one path of the identified retinal feature (e.g., a blood vessel) at step 706. A path may be an approximate center line of a blood vessel, or another representation of the retinal feature's geometry. FIGS. 12A-12D illustrate a suitable path detection technique. FIG. 12A is a color fundus image, and FIG. 12B is a close-up of the portion of FIG. 12A corresponding to the box 1202 after the image of FIG. 12A has undergone smoothing and segmenting (in accordance with step 704). FIG. 12C is a close-up of the portion of FIG. 12B corresponding to the box 1204 after the image of FIG. 12B has undergone blood vessel identification as described above with reference to FIG. 11. FIG. 12D illustrates the result of applying a "skeletonizing" technique to the image of FIG. 12C. Skeletonizing techniques are commonly known and used in image processing for identifying a structural framework or "skeleton" of an image. Many suitable skeletonizing techniques are described in the literature; see, for example, Reniers et al., "Skeleton-based hierarchical shape segmentation," Proc. of the IEEE Int. Conf. on Shape Modeling and Applications, pp. 179-188 (2007), which is incorporated by reference herein in its entirety.

As illustrated in FIG. 12D, however, skeletonizing techniques applied to blood vessels and other retinal features can result in side branches (such as side branches 1208 and 1210) that stem from a principal vessel path. In some embodiments, system 100 removes these side branches from the skeletonized image before performing additional processing steps.

Figure 13A:
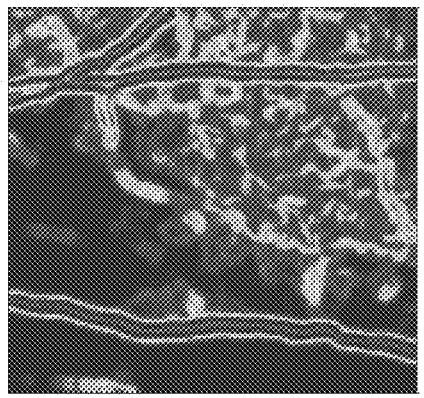
FIGS. 13A-13C illustrate operations and intermediate results of a blood vessel identification technique in accordance with an embodiment.
Figure 13B:
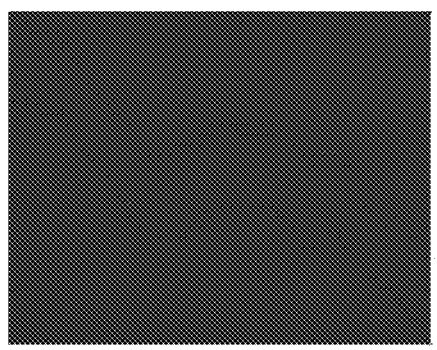
Figure 13C:
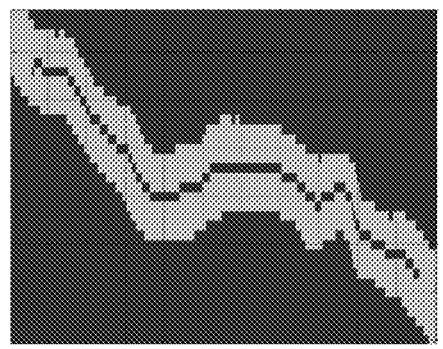

FIGS. 13A-13C provide additional illustrations of the operations and intermediate results that may be generated at step 706 when the system 100 identifies a blood vessel in a smoothed and segmented image. FIG. 13A depicts a smoothed and segmented image, FIG. 13B depicts vessel boundaries determined by the edge values, and FIG. 13C illustrates the path of the blood vessel obtained by skeletonizing the image of FIG. 13B to find an approximate center line. In some embodiments, the vessel boundaries may be determined by the intensity values, in addition to or instead of the edge values.

At step 708, system 100 analyzes the data, edge and other attributes associated with identified retinal features in the smoothed and segmented image to identify a retinal abnormality. System 100 may be configured with hardware or software to evaluate the smoothed and segmented image for the presence of different features which identify different abnormalities. A number of features and abnormality identification techniques are now discussed.

Figure 8:
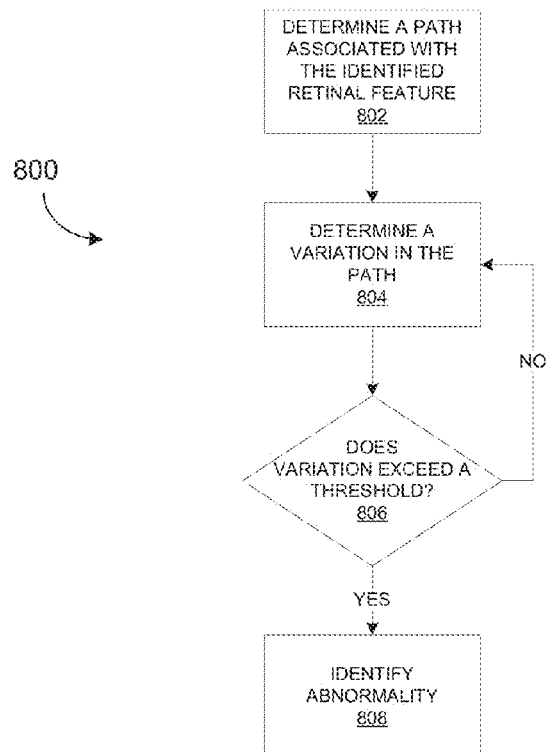
FIG. 8 is a flow diagram of an abnormality detection technique in accordance with an embodiment.

FIG. 8 is a flow diagram of an abnormality detection technique 800 in accordance with an embodiment. The technique 800 is well-suited for identifying venous caliber abnormalities (VCABs) and venous beading, for example, among other abnormalities. At step 802, the system 100 determines a path associated with an identified retinal feature. This step may be performed as described above with reference to step 706 of FIG. 7. For example, the path may be obtained by skeletonizing the smoothed and segmented image of a blood vessel to determine an approximate center line.

At step 804, the system 100 determines a variation in the path determined at step 802. To do this, the system 100 may be configured to first detect one or more different properties of the path (and the retinal feature it represents), including:

an angle of orientation of the path at different locations along the path; and a diameter of a blood vessel at different locations along the path.

Spatial variations in these properties along a vessel may be used as indicators of retinal abnormalities. In particular, at step 806, the system 100 determines whether a variation at any location along the path exceeds a threshold. If yes, the system 100 proceeds to step 808 and identifies a retinal abnormality at the location. Several illustrative embodiments of technique 800 are now discussed.

Figure 14A:
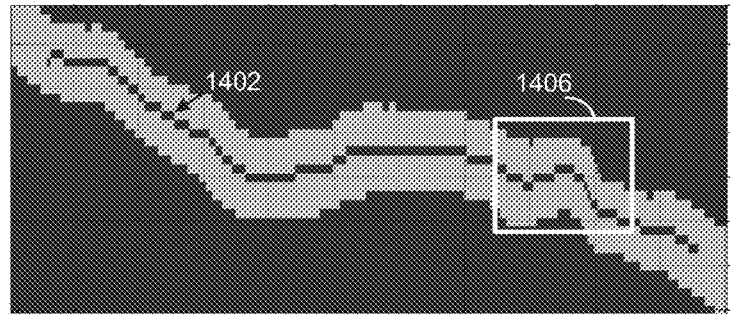
FIGS. 14A-14C illustrates an embodiment that determines a variation in a slope of the path of a blood vessel.
Figure 14B:
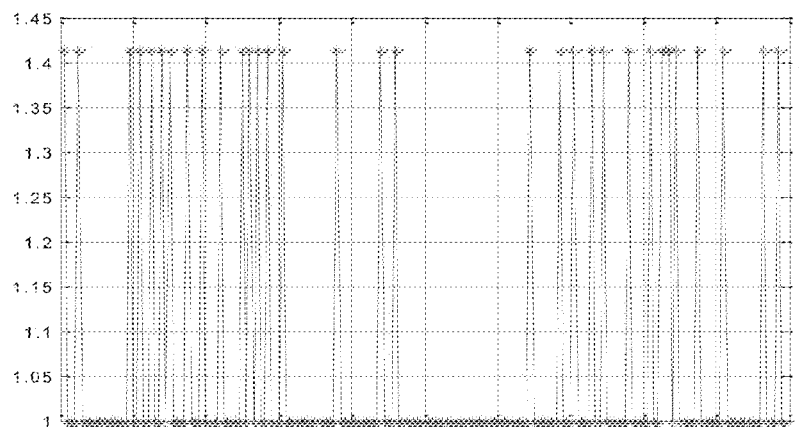
Figure 14C:
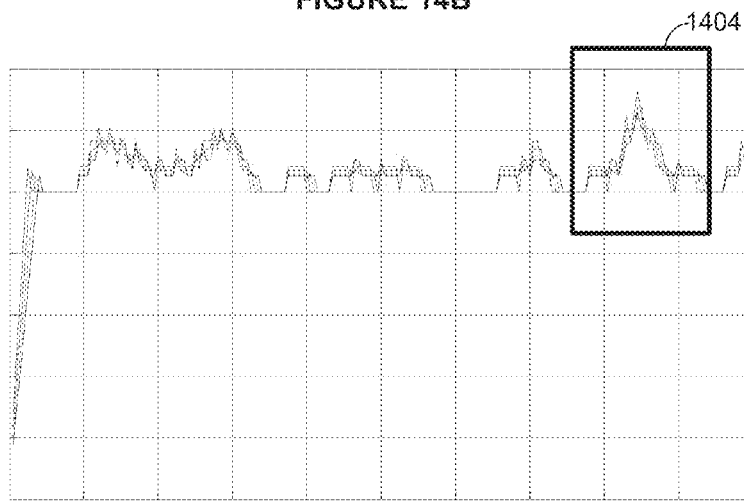

FIGS. 14A-14C illustrate an embodiment in which system 100 determines a variation in a slope of the path of the identified retinal feature at step 804. FIG. 14A depicts the identified vessel and its center line 1402 (as discussed above with reference to FIG. 13). FIG. 14B is a graph of the absolute value of the slope of center line 1402 along its length (i.e., at a sequential plurality of locations). Note that the slope at any point along the path in FIG. 14B is discretized (here, either 0 or $\sqrt{2}$) because of the discrete distances between adjacent pixels. FIG. 14C is a graph of four moving window averages of the slope plotted in FIG. 14B, wherein each moving window average has a different pixel window width (here, 5 (blue), 6 (red), 7 (green) and 8 (black)). Performing a moving window average of the slope of center line 1402 is one way of filtering the slope results, and any other filtering operation or combination of filtering operations may be applied.

FIG. 14C indicates a peak in the region of box 1404, which corresponds to the sustained slope change in FIG. 14A in the region of box 1406. System 100 may include a threshold value against which the filtered slope of FIG. 14C are compared; when the filtered slope (e.g., the variation of the path) exceeds a threshold, an abnormality is identified (step 808).

Figure 15A:
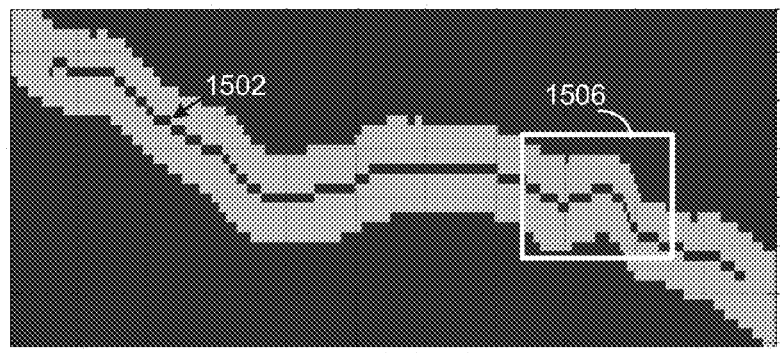
FIGS. 15A-15C illustrate an embodiment that determines a variation in an angle of orientation of a blood vessel.
Figure 15B:
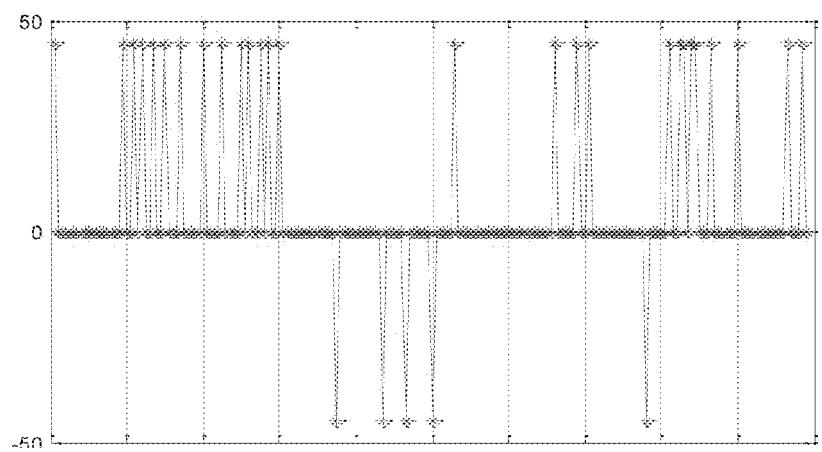
Figure 15C:
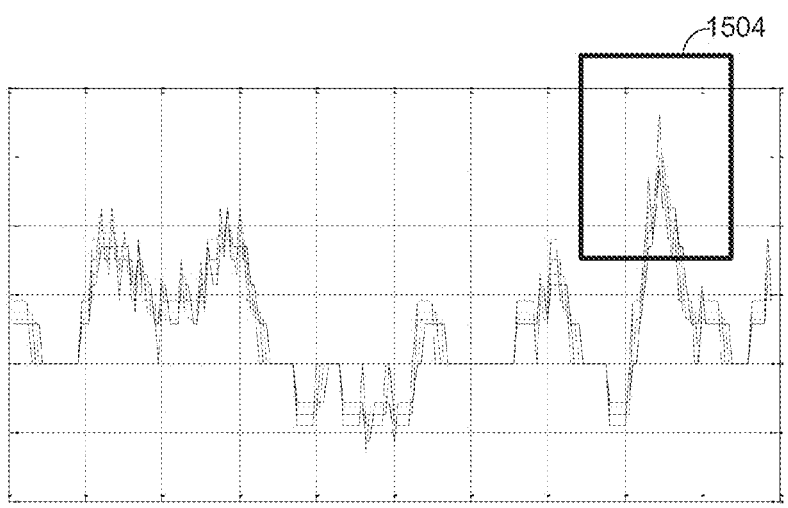

FIGS. 15A-15C illustrate an embodiment in which system 100 determines a variation in an angle of orientation of the identified retinal feature at step 804. FIG. 15A depicts an identified vessel and its center line 1502, and FIG. 15B is a graph of the angle of orientation of the center line 1502 along its length (i.e., at a sequential plurality of locations). Note that the angle at any point along the path in FIG. 15B is discretized (here, −45, 0, or 45 degrees) because of the discrete angles between adjacent pixels. FIG. 15C is a graph of four moving window averages of the angle plotted in FIG. 15B, wherein each moving window average has a different pixel window width (here, 5 (blue), 6 (red), 7 (green) and 8(black)). FIG. 15C indicates a peak in the region of box 1504, which corresponds to the kink in FIG. 15A in the region of box 1506. As discussed above with respect to FIGS. 14A-14C, when the filtered angle exceeds a threshold, the system 100 may identify an abnormality (step 808).

Figure 16A:
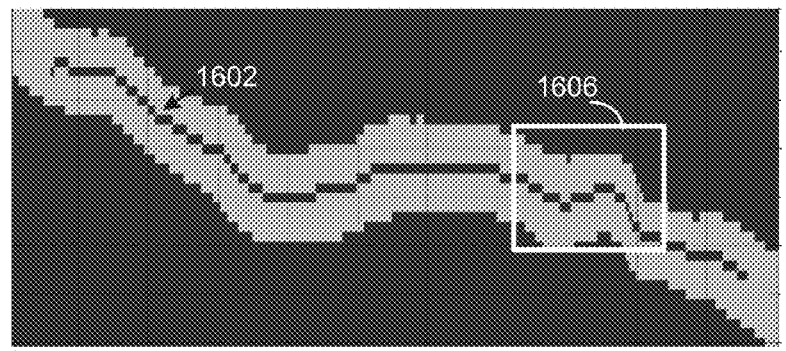
FIGS. 16A-16C illustrate an embodiment that determines a variation in a radius of a blood vessel.
Figure 16B:
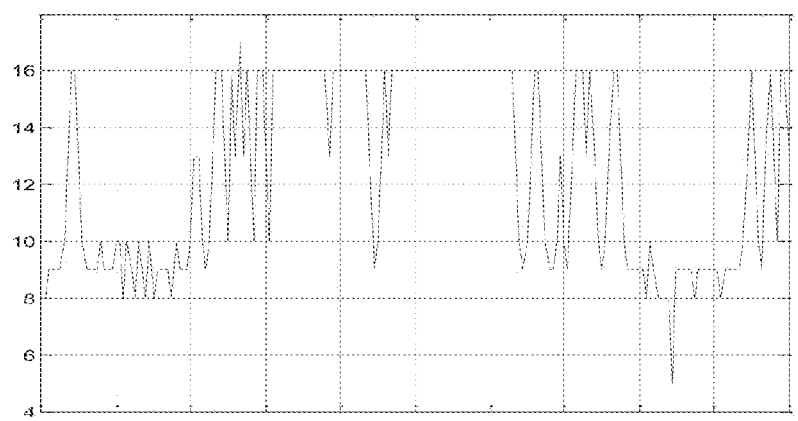
Figure 16C:
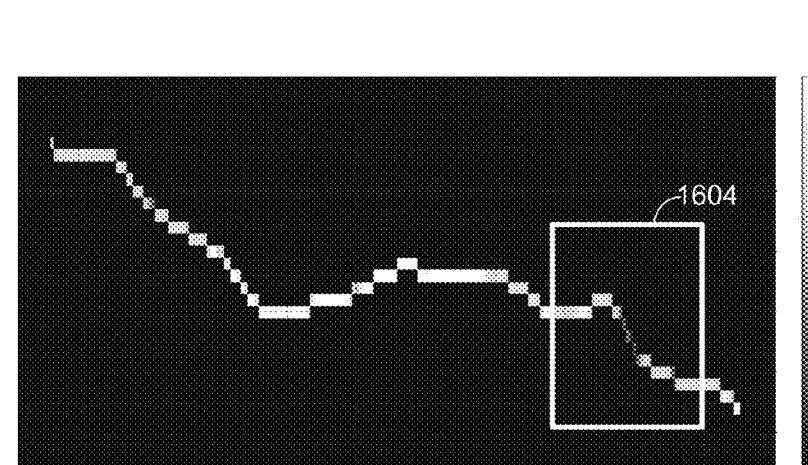

FIGS. 16A-16C illustrate an embodiment in which system 100 determines a variation in a radius of the retinal feature at step 804. FIG. 16A depicts an identified vessel and its center line 1602, and FIG. 16B is a graph of the radius of the blood vessel along the length of the center line 1602 (i.e., at a sequential plurality of locations). FIG. 16C uses color variation to indicate the radius of the vessel at corresponding points along the center line 1602, and indicates a red narrowing in the region of box 1604, which corresponds to the narrowing in FIG. 16A in the region of box 1606. As discussed above with respect to FIGS. 14A-14C, when the radius decreases below a particular radius (or decreases below a specified percentage of a nominal or average radius), the system 100 may determine that the narrowing has exceeded a threshold and identify an abnormality (step 808). In some embodiments, the system 100 may identify a venous beading abnormality at step 808 by detecting a significant variation in the radius of a vessel along its length, for example, by normalizing the radius by its local standard deviation and analyzing the variation of the normalized radius.

In some embodiments, characteristics other than slope, angle, and radius are detected and analyzed by system 100. For example, system 100 may be configured for the detection and classification of PRHs, and may identify characteristics such as shape parameters (e.g., aspect ratio), area of the retina covered, size of the lesion, and textures in and outside. In another example, system 100 may be configured for the detection and classification of IRMAS, and may identify characteristics such as shape, the area covered by the contour of the candidate IRMA vessel, and whether or not the contour is closed. In some embodiments, the boundaries of a vessel may be analyzed separately to identify vessel characteristics. For example, a rapid change in an edge value at the boundary of a vessel may indicate an abnormality.

In some embodiments, the system 100 may be configured to determine whether a bifurcation is present at a location identified as part of a blood vessel. The system 100 may make this determination in response to determine that a variation in the vessel has exceeded a threshold (e.g., as discussed above with respect to step 806 of FIG. 8), or at any other stage in the analysis of a retinal image. In certain retinal imaging applications, the location of bifurcations is relevant to the diagnosis of retinal pathologies. In other retinal imaging applications, bifurcations are desirably filtered out or otherwise ignored during abnormality detection (e.g., when they may be mistakenly interpreted by system 100 as a VCAB or venous beading). Any of a number of bifurcation detection techniques may be used to identify vessel bifurcations in a smoothed and segmented image. Examples of known techniques are given in Zana et al., "A multimodal registration algorithm of eye fundus images using vessel detection and Hough transforms," IEEE Trans. Med. Imaging, v. 18, n. 5, pp. 419-428 (1999), incorporated by reference herein in its entirety.

Figure 17A:
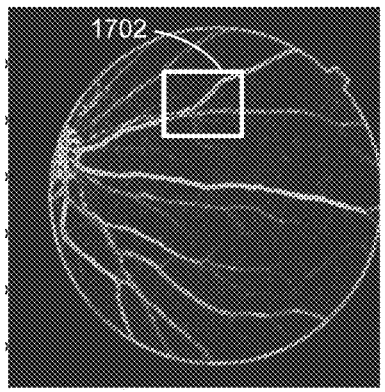
FIGS. 17A-17F illustrate a vessel bifurcation and the analysis of each of its two branches for retinal abnormalities, in accordance with an embodiment.
Figure 17B:
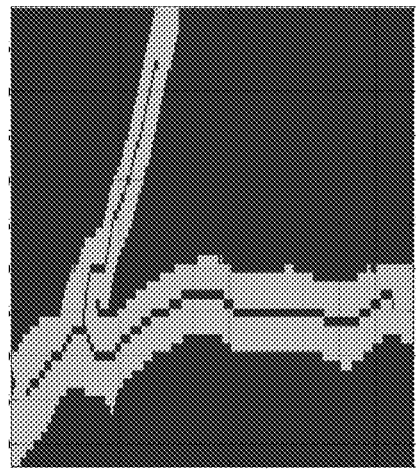
Figure 17C:
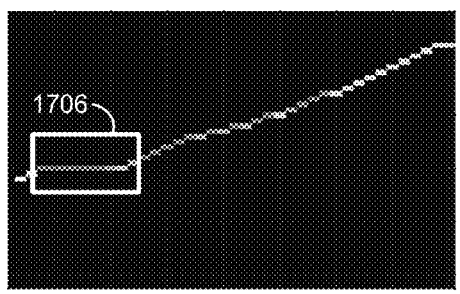
Figure 17D:
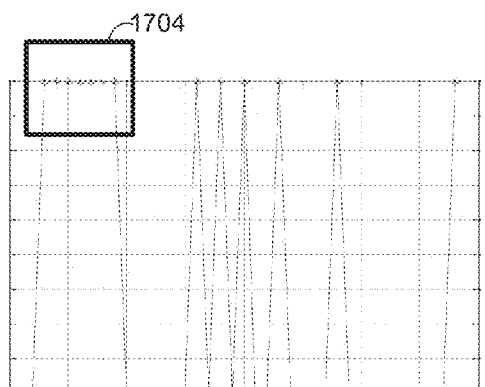
Figure 17E:
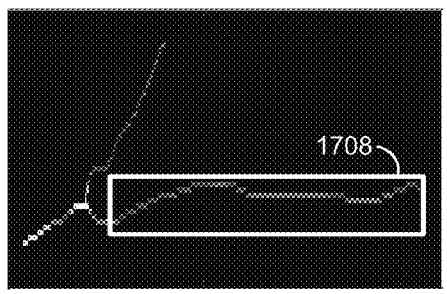
Figure 17F:
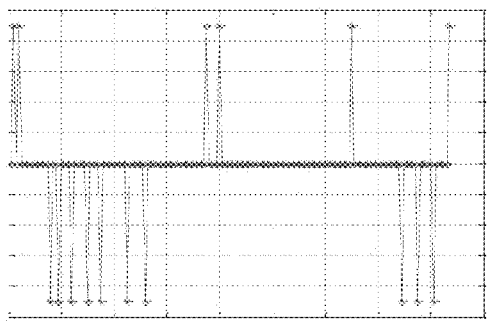

In some embodiments, the identification of a bifurcation is followed by the separate analysis of each of the two "branches" for retinal abnormalities. FIGS. 17A-17F illustrate such an embodiment. FIG. 17A depicts a smoothed and segmented fundus image, and FIG. 17B is a close-up of the portion of the image of FIG. 17A indicated by box 1702. FIG. 17B clearly illustrates a vessel bifurcation. The top branch of the bifurcation is illustrated in FIG. 17C, and the angle of orientation of the top branch is plotted in FIG. 17D. A sustained angle variation is indicated by box 1704, and corresponds to the retinal abnormality indicated by box 1706. The bottom branch of the bifurcation is illustrated in box 1708 of FIG. 17E, and the angle of orientation of the bottom branch is plotted in FIG. 17F. The plot of FIG. 17F indicates no sustained angle variation, and thus no retinal abnormality is detected in the bottom branch.

The systems and methods described herein are usefully applied to non-vascular retinal features and abnormalities, such as hard exudates and cotton wool spots. For example, cotton wool spots are white patches on the retina caused by nerve damage, and can be identified by the smoothing, segmenting and texture analysis techniques disclosed.

Optionally, the system 100 may be configured with one or more pre-processing techniques that can be applied to images of the retina before the abnormality detection techniques described herein (such as techniques 700 and 800 of FIGS. 7 and 8, respectively). Examples of these pre-processing techniques include the contrast enhancement, registration, and other morphological techniques described in Walter et al., "Segmentation of color fundus images of the human retina:

detection of the optic disc and the vascular tree using morphological techniques," in Crespo et al., eds., Lecture Notes in Computer Science, v. 2199, pp. 282-287 (2001); Walter et al., "A contribution of image processing to the diagnosis of diabetic retinopathy: detection of exudates in color fundus images of the human retina," IEEE Trans. Med. Imaging, v. 21, pp. 1236-1243 (2002); and Walter et al., "Automatic detection of microaneurysms in color fundus images," Med. Image Analysis, v. 11, pp. 555-566 (2007), each of which is hereby incorporated by reference herein in its entirety.

Additionally, point spikes in any intermediate data set (e.g., slope, angle of orientation, radius, etc.) may be selectively removed by applying one or more robust sequential detection algorithms. One such algorithm is described in Desai et al., "Dual sensor failure identification using analytic redundancy," J. Guidance and Control, v. 2, n. 3, pp. 2213-2220 (1979), incorporated by reference in its entirety herein.

As discussed above, the image analysis techniques described herein can identify attributes of an image, such as texture. In some retinal imaging applications, texture analysis improves the detection of anomalies, and in particular, fine or high spatial frequency anomalies. Edges provide one type of measure of "higher frequency" features, and others may be used as well. Traditional algorithms for texture analysis usually require that regions to be analyzed be sufficiently large to contain rectangular subregions of relatively homogeneous subtextures. However, in retinal imaging, abnormal structures are small, heterogeneous, and of irregular shape. Analysis of such shapes requires an improved algorithm suited to these abnormalities.

The Matrix Edge Onion Peel (MEOP) methodology may be used to identify retinal abnormalities on the basis of their texture. In some embodiments, where textural regions are sufficiently large, a texture wavelet analysis algorithm may be used, but combined with an MEOP algorithm for textural regions of small size. This methodology is described in Desai et al., "Noise Adaptive Matrix Edge Field Analysis of Small Sized Heterogeneous Onion Layered Textures for Characterizing Human Embryonic Stem Cell Nuclei," ISBI 2009, pp. 1386-1389, incorporated by reference in its entirety herein. An energy functional approach may be used for simultaneous smoothing and segmentation. The methodology includes two features: a matrix edge field, and adaptive weighting of the measurements relative to the smoothing process model. The matrix edge function adaptively and implicitly modulates the shape, size, and orientation of smoothing neighborhoods over different regions of the texture. It thus provides directional information on the texture that is not available in the more conventional scalar edge field based approaches. The adaptive measurement weighting varies the weighting between the measurements at each pixel.

In some embodiments, nonparametric methods for identifying retinal abnormalities may be used. These methods may be based on combining level set methods, multiresolution wavelet analysis, and non-parametric estimation of the density functions of the wavelet coefficients from the decomposition. Additionally, to deal with small size textures where the largest inscribed rectangular window may not contain a sufficient number of pixels for multiresolution analysis, we propose an adjustable windowing method that enables the multiresolution analysis of elongated and irregularly shaped nuclei. In some exemplary embodiments, the adjustable windowing approach combined with non-parametric density models yields better classification for cases where parametric density modeling of wavelet coefficients may not applicable.

Such methods also allow for multiscale qualitative monitoring of retinal images over time, at multiple spatiotemporal resolutions. Statistical multiresolution wavelet texture analysis has been shown to be effective when combined with a parametric statistical model, the generalized Gaussian density (GGD), used to represent the wavelet coefficients in the detail subbands. Parameteric statistical multiresolution wavelet analysis as previously implemented, however, has limitations: 1) it requires a user to manually select rectangular, texturally homogeneous regions of sufficient size to enable texture analysis, and 2) it assumes the distribution of coefficients is symmetric, unimodal, and unbiased, which may be untrue for some textures. As described above, in some applications, the Matrix Edge Onion Peel algorithm may be used for small size irregularly shaped structures that exhibit "onion layer" textural variation (i.e., texture characteristics that change as a function of the radius from the center of the structure).

In some embodiments, an algorithm may be used to automatically segment retinal features, and an adjustable windowing method may be used in order to maximize the number of coefficients available from the multiresolution decomposition of a small, irregularly shaped (i.e. non rectangular) region. These steps enable the automatic analysis of images with multiple retinal features, eliminating the need for a human to manually select windows in order to perform texture analysis. Finally, a non-parametric statistical analysis may be applied to cases where the parametric GGD model is inapplicable. This analysis may yield superior performance over the parametric model in cases where the latter is not applicable.

A number of additional image processing techniques are suitable for use in the retinal imaging systems and methods disclosed herein, including wavelet-based texture models, adaptive windowing for coefficient extraction, PDF and textural dissimilarity estimation, and density models such as the generalized Gaussian and symmetric alpha-stable, and KLD estimators such as the Ahmad-Linand the Loftsgaarden-Quesenberry.

In some embodiments, more than one of the techniques described herein may be used in combination, for example, in parallel, in series, or fused using nonlinear classifiers such as support vector machines or probabilistic methods. Using multiple techniques for each retinal abnormality may improve accuracy without substantially compromising speed. Additionally, any of the techniques described herein are useful in determining the level of diabetic retinopathy or diabetic macular edema according to the Early Treatment Diabetic Retinopathy Study classification scale commonly used in the field.

The invention may be embodied in other specific forms without departing form the spirit or essential characteristics thereof. The forgoing embodiments are therefore to be considered in all respects illustrative, rather than limiting of the invention.

What is claimed is:

1. A computerized method for detecting retinal abnormalities, comprising:
 receiving, by a computer, an image of a retina;
 smoothing and segmenting the image, by the computer, wherein the smoothing and segmenting are interdependent and smoothing and segmenting further comprise:
  reducing the value of a first and a second energy function, wherein the first energy function uses a first error metric and the second energy function uses a second error metric different from the first error metric; and combining information about a first and a second set of smoothing and segmenting parameters obtained by reducing the value of the first and the second energy functions;
identifying, in the smoothed and segmented image, by the computer, at least one retinal feature; and
analyzing, by the computer, the identified at least one retinal feature in the smoothed and segmented image to identify a retinal abnormality.

2. The method of claim 1, wherein the at least one retinal feature comprises a blood vessel.

3. The method of claim 2, wherein analyzing the identified at least one blood vessel comprises:
determining at least one path associated with the at least one blood vessel in the image;
determining a variation in at least one of: an angle of orientation of the path at a location along the path, and a diameter of the at least one blood vessel at a location along the path;
when the variation exceeds a threshold, identifying a retinal abnormality at the location.

4. The method of claim 3, wherein the segmenting and smoothing comprises determining an edge field strength at a plurality of locations in the image, with the at least one path is determined based at least in part on the edge field strength.

5. The method of claim 3, wherein determining at least one path comprises determining at least one center line associated with the at least one blood vessel in the image.

6. The method of claim 3, wherein determining a variation in an angle of orientation comprises determining a change in the angle of orientation between the sequential plurality of locations.

7. The method of claim 3, further comprising: filtering, by the computer, a plurality of variations.

8. The method of claim 7, wherein filtering the plurality of variations comprises applying a moving window average.

9. The method of claim 7, wherein the variation exceeds a threshold when at least one of the filtered plurality of variations exceeds the threshold.

10. The method of claim 3, further comprising:
when the variation at a location exceeds a threshold, determining, by the computer, whether a vessel bifurcation is present at the location; and
when a vessel bifurcation is present at the location, filtering out the variation by the computer.

11. The method of claim 1, wherein the abnormality is a venous caliber abnormality.

12. The method of claim 1, wherein the abnormality is a new vascularity.

13. The method of claim 1, wherein smoothing and segmenting comprises:
adaptively adjusting, by the computer, at least one of a shape and orientation defining a neighborhood associated with a plurality of locations in the image.

14. The method of claim 13, wherein adaptively adjusting at least one of a shape and orientation of a neighborhood comprises reducing the value of an energy function associated with an error metric.

15. The method of claim 1, wherein analyzing the identified at least one retinal feature comprises analyzing a texture of the image.

16. A system for detecting retinal abnormalities, comprising:
a processor configured to: receive an image of a retina;
smooth and segment the image, wherein the smoothing and segmenting are interdependent and smoothing and segmenting further comprise:
reducing the value of a first and a second energy function, wherein the first energy function uses a first error metric and the second energy function uses a second error metric different from the first error metric; and
combining information about a first and a second set of smoothing and segmenting parameters obtained by reducing the value of the first and the second energy functions;
identify, in the smoothed and segmented image, at least one retinal feature;
analyze the identified at least one retinal feature in the smoothed and segmented image to identify a retinal abnormality.

17. The system of claim 16, wherein the at least one retinal feature comprises a blood vessel.

18. The system of claim 17, wherein analyzing the identified at least one blood vessel comprises:
determining at least one path associated with the at least one blood vessel in the image;
determining a variation in at least one of: an angle of orientation of the path at a location along the path, and a diameter of the at least one blood vessel at a location along the path;
when the variation exceeds a threshold, identifying a retinal abnormality at the location.

19. The system of claim 18, wherein the segmenting and smoothing comprises determining an edge field strength at a plurality of locations in the image, with the at least one path associated with the at least one blood vessel in the image is determined based at least in part on the edge field strength.

20. The system of claim 18, wherein determining at least one path comprises determining at least one center line associated with the at least one blood vessel in the image.

21. The system of claim 18, wherein determining a variation in an angle of orientation comprises determining a change in the angle of orientation between the sequential plurality of locations.

22. The system of claim 18, the processor further configured to: filter a plurality of variations.

23. The system of claim 22, wherein filtering the plurality of variations comprises applying a moving window average.

24. The system of claim 22, wherein the variation exceeds a threshold when at least one of the filtered plurality of variations exceeds the threshold.

25. The system of claim 18, wherein the processor is further configured to:
when the variation at a location exceeds a threshold, determine whether a vessel bifurcation is present at the location; and
when a vessel bifurcation is present at the location, filter out the variation by the computer.

26. The system of claim 16, wherein the abnormality is a venous caliber abnormality.

27. The system of claim 16, wherein the abnormality is a new vascularity.

28. The system of claim 16, wherein smoothing and segmenting comprises: adaptively adjusting, by the computer, at least one of a shape and orientation defining a neighborhood associated with a plurality of locations in the image.

29. The system of claim 28, wherein adaptively adjusting at least one of a shape and orientation of a neighborhood comprises reducing the value of an energy function associated with an error metric.

30. The system of claim 16, wherein analyzing the identified at least one blood vessel comprises analyzing a texture of the image.

31. Non-transitory computer readable media storing computer executable instructions, which when executed by such a computer, cause the computer to carry out a method comprising:
- receiving an image of a retina;
- smoothing and segmenting the image wherein the smoothing and segmenting are interdependent and smoothing and segmenting further comprise:
  - reducing the value of a first and a second energy function, wherein the first energy function uses a first error metric and the second energy function uses a second error metric different from the first error metric; and
  - combining information about a first and a second set of smoothing and segmenting parameters obtained by reducing the value of the first and the second energy functions;
- identifying, in the smoothed and segmented image, at least one retinal feature;
- analyzing the identified at least one retinal feature in the smoothed and segmented image to identify a retinal abnormality.

32. The non-transitory computer readable media of claim 31, wherein the at least one retinal feature comprises a blood vessel.

* * * * *